(12) United States Patent
Livneh

(10) Patent No.: US 10,467,923 B2
(45) Date of Patent: Nov. 5, 2019

(54) SYSTEM AND METHOD FOR IDENTIFYING A DEVIATION OF AN OPERATOR OF A VEHICLE FROM A DOCTRINE

(71) Applicant: Elbit Systems Ltd., Haifa (IL)

(72) Inventor: Ofer Livneh, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 15/754,221

(22) PCT Filed: Aug. 25, 2016

(86) PCT No.: PCT/IL2016/050937
§ 371 (c)(1),
(2) Date: Feb. 21, 2018

(87) PCT Pub. No.: WO2017/033196
PCT Pub. Date: Mar. 2, 2017

(65) Prior Publication Data
US 2018/0247558 A1    Aug. 30, 2018

(30) Foreign Application Priority Data

Aug. 25, 2015   (IL) .......................................... 240831

(51) Int. Cl.
*G09B 9/24*     (2006.01)
*G09B 9/08*     (2006.01)
(Continued)

(52) U.S. Cl.
CPC ............... *G09B 9/24* (2013.01); *B60W 40/09* (2013.01); *G09B 9/06* (2013.01); *G09B 9/08* (2013.01)

(58) Field of Classification Search
CPC ............ G09B 9/24; G09B 9/08; G09B 9/052; B60W 40/09
(Continued)

(56) References Cited

U.S. PATENT DOCUMENTS

| 6,053,737 A | 4/2000 | Babbitt et al. |
| 7,599,765 B2 | 10/2009 | Padan |

(Continued)

FOREIGN PATENT DOCUMENTS

| DE | 10344041 A1 | 4/2005 |
| EP | 0831444 B1 | 4/1999 |

(Continued)

OTHER PUBLICATIONS

International Preliminary Report on Patentability dated Nov. 13, 2017 for International Application No. PCT/IL2016/050937 (18 Pages).

(Continued)

*Primary Examiner* — Robert P Bullington
(74) *Attorney, Agent, or Firm* — Brown Rudnick LLP

(57) ABSTRACT

A profile comparator for comparing between a human operator and a clone including a storage device, a simulation processor and a parameter comparator, the storage device including a recording of at least one parameter during an activity session of a platform, the platform including at least one control system, the parameter being at least one of a parameter of the platform and an action of an operator of the platform during the activity session, and a predetermined profile, the simulation processor configured to generate a virtual clone of the platform according to at least one of the recorded parameter, the simulation processor being further configured to manage the virtual clone according to the predetermined profile, the parameter comparator configured to compare at least one comparison parameter relative to the comparison parameter of the virtual clone and configured to determine at least one deviation wherein the comparison parameter deviates from the comparison parameter of the virtual clone.

18 Claims, 4 Drawing Sheets

(51) Int. Cl.
*B60W 40/09* (2012.01)
*G09B 9/06* (2006.01)

(58) Field of Classification Search
USPC .......................................................... 434/35
See application file for complete search history.

(56) References Cited

U.S. PATENT DOCUMENTS

| | | |
|---|---|---|
| 7,769,502 B2 | 8/2010 | Herman |
| 8,126,838 B2 | 2/2012 | Stone et al. |
| 8,538,739 B2 | 9/2013 | Woodbury |
| 8,781,802 B2 | 7/2014 | Hagelin et al. |
| 8,791,836 B2 | 7/2014 | Herman |
| 8,944,822 B2 | 2/2015 | Gelinske et al. |
| 2005/0091018 A1 | 4/2005 | Craft |
| 2005/0119769 A1 | 6/2005 | Labreuche |
| 2005/0137756 A1 | 6/2005 | Takahashi |
| 2006/0271245 A1* | 11/2006 | Herman ................ F41G 7/007 701/1 |
| 2010/0283633 A1 | 11/2010 | Becker et al. |
| 2011/0196551 A1 | 8/2011 | Lees et al. |
| 2012/0053916 A1* | 3/2012 | Tzidon .................... G09B 9/08 703/8 |
| 2014/0220527 A1 | 8/2014 | Li et al. |
| 2015/0004574 A1* | 1/2015 | Bomer ..................... G09B 9/04 434/219 |
| 2015/0111184 A1 | 4/2015 | Rikkola et al. |
| 2015/0175168 A1 | 6/2015 | Hoye et al. |
| 2015/0187224 A1 | 7/2015 | Moncrief et al. |
| 2015/0356780 A1* | 12/2015 | Madegowda ............ G09B 5/14 345/633 |

FOREIGN PATENT DOCUMENTS

| | | |
|---|---|---|
| GB | 2474564 A | 4/2011 |
| KR | 101282953 B1 | 7/2013 |
| WO | 1998052175 A2 | 11/1998 |
| WO | 2002029765 A1 | 4/2002 |
| WO | 2003054604 A2 | 7/2003 |
| WO | 2004051485 A1 | 6/2004 |
| WO | 2009088308 A2 | 7/2009 |
| WO | 2013124856 A1 | 8/2013 |
| WO | 2014021961 A2 | 2/2014 |

OTHER PUBLICATIONS

International Search Report and Written Opinion of the International Searching Authority dated Mar. 2, 2017 for International Application No. PCT/IL2016/050937 (8 Pages).

* cited by examiner

SYSTEM AND METHOD FOR IDENTIFYING A DEVIATION OF AN OPERATOR OF A VEHICLE FROM A DOCTRINE

FIELD OF THE DISCLOSED TECHNIQUE

The disclosed technique relates to activity debriefing in general, and to systems and methods for identifying a deviation of an operator from a predetermined profile or doctrine and the results of such deviation, in particular.

BACKGROUND OF THE DISCLOSED TECHNIQUE

Debriefing is a practice of reviewing and discussing an activity following completion of the activity, for obtaining data about the activity. Following a completion of a mission (or generally any activity) a debriefing takes place for learning the details of the activity (i.e., what actually happened), and for trying to learn lessons from the activity. For example, the participants can be interrogated about the activity and their actions and decisions. The debriefing is directed, amongst other things, at trying to determine what worked well and what could have been done better.

Reference is now made to U.S. Pat. No. 6,053,737 issued to Babbitt et al., and entitled "Intelligent Flight Tutoring System". This publication is directed to a method for tutoring a trainee in a simulator. The method involves constructing a decision support system, monitoring the trainee flight, comparing the trainee flight to the decision support system, and determining how closely the trainee flight resembles an expert's flight.

Reference is now made to U.S. Pat. No. 7,599,765, issued to Padan, and entitled "Dynamic Guidance for Close-In Maneuvering Air Combat". This publication is directed to a method for optimizing the conduct of a close-in air combat are disclosed. The method involves providing in real-time a computer-based close-in air combat situation assessment and information analysis. The current situation is assessed according to data obtained from onboard sensors and remote sensors. The system generates a recommendation based on the assessment of the current situation and according to predefined optimal maneuvering formulas (i.e., specific algorithms corresponding to the physical/mathematical formulas operative for the optimal relative offensive/defensive maneuvering during a close-in combat).

Reference is now made to U.S. Pat. No. 8,538,739, issued to Woodbury, and entitled "Adjusting Model Output Events in a Simulation". This publication is directed to a simulator system. The system receives input data from a user. The system determines reference data based on an original simulation state. That is, based on the original simulation state, an expected next move of the user is determined. The reference data is compared to the input data, and an adjustment amount is determined based on the difference between the input data and the reference data.

Thereafter, an event value is generated via a probability function, and the event value is adjusted by the adjustment amount into an adjusted event value. A next simulation state is then determined based on the adjusted event value and the next simulation state is presented to a user. In this way, direct feedback to the user is provided via each next simulation state, which positively reinforces correct behavior and negatively reinforces incorrect behavior.

SUMMARY OF THE PRESENT DISCLOSED TECHNIQUE

It is an object of the disclosed technique to provide a novel method and system for comparing the profile of an operator of a platform and that of a clone, and for presenting the deviations of the operator from a predefined profile and the consequences of such deviations. The profile comparator can be used with a debriefing system. In accordance with an embodiment of the disclosed technique, there is thus provided a profile comparator for comparing between a human operator and a clone. The profile comparator includes a storage device, a simulation processor and a parameter comparator. The storage device includes a recording of at least one parameter during an activity session of a platform and a predetermined profile. The platform includes at least one control system. The at least one parameter can be at least one of a parameter of the platform during the activity session and an action of an operator of the platform during the activity session. The simulation processor is configured to generate a virtual clone of the platform according to at least one of the recorded parameters during the activity session. The simulation processor is further configured to manage the virtual clone according to the predetermined profile. The parameter comparator is configured to compare at least one comparison parameter during the activity session relative to the comparison parameter of the virtual clone of the platform. The parameter comparator is configured to determine at least one deviation wherein the comparison parameter during the activity session deviates from the comparison parameter of the virtual clone. The comparison parameter is at least one of the parameters recorded during the activity session and at least one derived parameter derived from at least one of the parameters recorded during the activity session.

In accordance with another embodiment of the disclosed technique, there is thus provided a method for comparing a profile between a human operator and a clone. The method includes the procedures of defining a profile for an activity session on a platform, recording at least one parameter during the activity session of the platform and generating a virtual clone of the platform. The recorded parameter is at least one of a parameter of the platform during the activity session and an action of an operator of the platform during the activity session. The virtual clone is generated according to at least one of the recorded parameters during the activity session. The method also includes the procedures of managing the virtual clone according to the defined profile, comparing at least one comparison parameter during the activity session relative to the comparison parameter of the virtual clone of the platform, and determining at least one deviation, wherein the comparison parameter during the activity session deviates from the comparison parameter of the virtual clone. The comparison parameter is at least one of the parameters recorded during the activity session and at least one derived parameter derived from at least one of the recorded parameters of the activity session.

In accordance with a further embodiment of the disclosed technique, there is thus provided a debriefing system for comparing between a human operator and a clone. The debriefing system includes a storage device, a simulation processor and a parameter comparator. The storage device includes a recording of at least one parameter during an activity session of a platform and a predetermined profile. The platform includes at least one control system and the parameter is at least one of a parameter of the platform during the activity session and an action of an operator of the platform during the activity session. The simulation processor is configured to generate a virtual clone of the platform according to at least one of the recorded parameters during the activity session. The simulation processor is further configured to manage the virtual clone according to the predetermined profile. The parameter comparator is configured to compare at least one comparison parameter during the activity session relative to the comparison parameter of the virtual clone of the platform. The parameter comparator is also configured to determine at least one deviation wherein the comparison parameter during the activity session deviates from the comparison parameter of the virtual clone. The comparison parameter is at least one of the recorded parameters recorded during the activity session and at least one derived parameter derived from at least one parameter recorded during the activity session.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
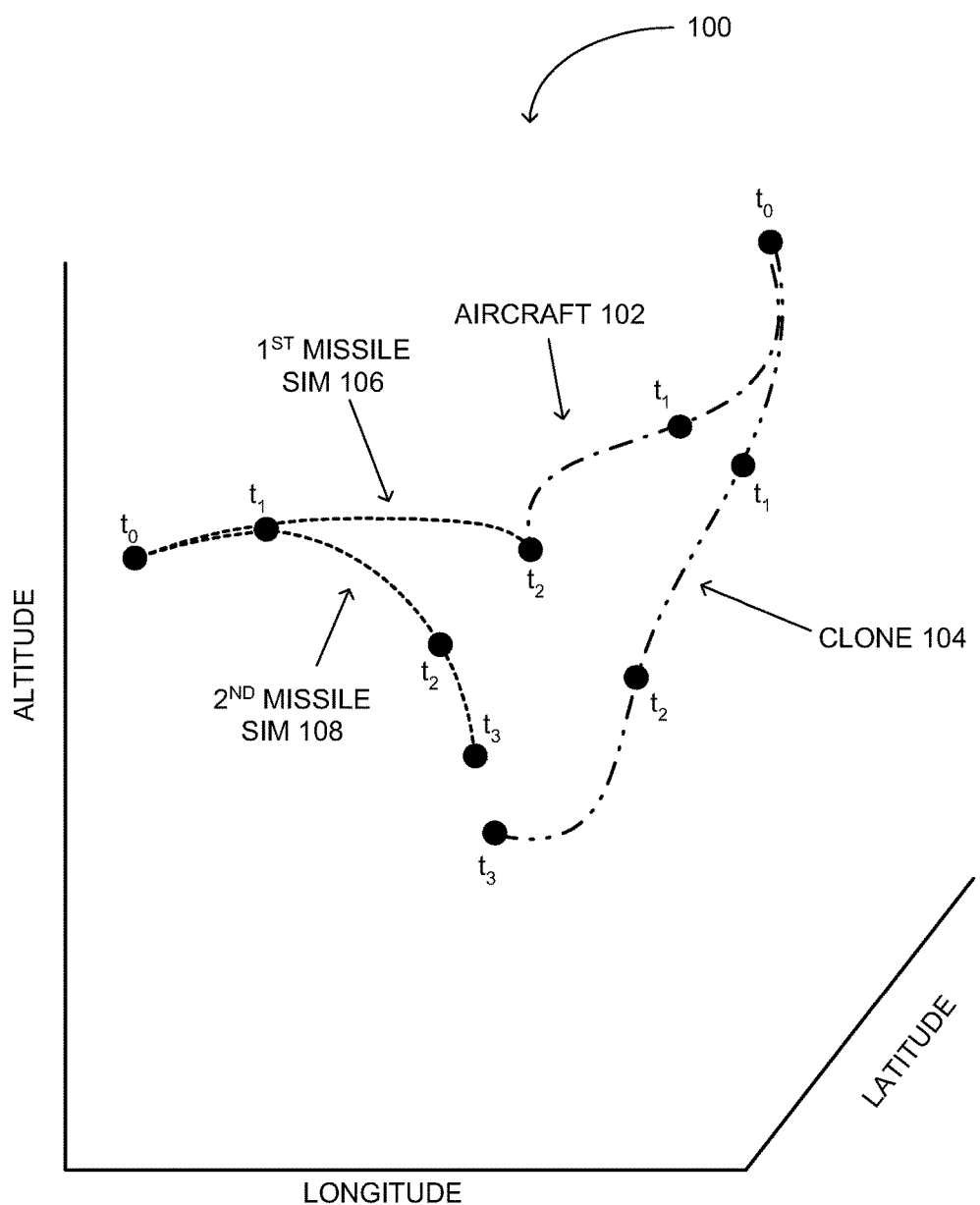
FIG. 1 is a schematic illustration of a graph depicting the states of an aircraft and of a virtual clone of the aircraft, constructed in accordance with an embodiment of the disclosed technique.

The disclosed technique overcomes the disadvantages of the prior art by providing a system and a method for identifying a deviation of an operator from a predetermined profile. The system and method of the disclosed technique further determine the results (or consequences) of such deviation. Thus, the system and method of the disclosed technique provides a comparison tool, to be used in a debriefing tool (for example), for the operator, and for other users, to review the activity session of the operator. The disclosed technique can also be referred to more generally as a profile comparator between a human operator and a clone, as described below. It is noted that term "profile" as used herein can also be referred to as a "doctrine" or "scheme" and that these words are used interchangeably. In general, a profile refers to a set of actions of the operator, outcomes and results of an activity on a platform, including the state or status of the platform during the activity. The profile thus represents either how an operator is supposed to act in an activity session, what an operator is supposed to do during the context of a given activity session, what kind of outcome the operator is supposed to achieve during the activity session, or a combination of those and represents the ideal or correct way for what the operator is to do during the activity session. Since a profile refers to the operation of a platform during an activity, it can include parameters about the platform during the activity as well as actions of the operator during the activity. Parameters about the platform can include the physical maneuvering of the platform in time and space. The profile can further include either outcomes, results or both concerning the platform and the activity. The profile can be characterized by a set of parameters or derived parameters. At minimum the profile should include at least one parameter or at least one derived parameter. A plurality of parameters can thus together be characterized as a state. Therefore a plurality of parameters related to the platform can be characterized as the state of the platform which can include a plurality of parameters related to the actions of an operator. It is noted that the doctrine or profile can be human generated or can be generated using artificial intelligence. For example, the profile may represent tried and tested principles of operating a specific platform, a user specific profile defined by a given user, or a profile determined by a neural network based on actual activity sessions of a plurality of users. It is further noted that the profile can include maneuvering of the platform in time and space in order to achieve goals such as minimum fuel usage, terrain following (minimum height), a pre-defined user profile or a statistical analysis of a plurality of users or operators with the best outcome. Thus the profile might define maneuvers for minimizing fuel usage or for following the altitude of the terrain. The profile might also be user-defined, as mentioned above or might be generated through statistical analysis of a plurality of operators during an activity session to determine which set of parameters achieves the best outcome of the activity session.

The operator can be operating any kind of platform, whether stationary or non-stationary and dynamic. The platform includes at least one control system for modifying parameters of the platform. Examples of non-stationary platforms include vehicles (e.g., aircraft such as an airplane or a helicopter; landcraft such as a race car, an ambulance or a tank; seacraft such as a robotic submarine or a fishing boat; and spacecraft), whereas examples of stationary platforms include stations (e.g., a Flight Simulator Training Device—FSTD, an airport control tower, a gun station, a robotic surgery system, and a crane), or any other system, such as a robotic surgical system. Herein below, the system operated by the operator (i.e., the operated system) is generally referred to as a vehicle, but can relate to every other system mentioned above (e.g., an FSTD) and can generally be called a platform.

The disclosed technique involves recording at least one parameter during the activity session. The at least one parameter can relate to parameters of the platform during the activity session, such as the state of the vehicle, a particular parameter of an FSTD, the maneuvering of the platform during the activity session and the like, as well as to actions of the operator of the platform during the activity session. The parameters of the platform relate to the native system of the platform, such as radar systems, communications systems and the like. The parameters of the platform also relate to the state or status of the platform, such as its speed, position, amount of fuel, orientation, weight and the like, with the particular parameters recorded during an activity session being dependent on the particular type of platform used with the disclosed technique. The actions of the operator can include inputs of the operator on the platform via an input device of the control system of the platform. Input devices can include pedals, gauges, buttons, switches, levers, sensors and the like for interacting with the control system or systems of the platform for modifying parameters of the platform. The actions of the operator can also include voice commands and/or utterances of the operator, either spoken or uttered during the activity session. The actions can further include the line-of-sight (herein LOS) of the operator and can be embodied as a measurement of the LOS of the operator. The actions of the operator thus represent how the operator uses his/her "senses" (i.e., hands and feet, meaning the sense of feeling/touch, eyes, meaning the sense of sight, and voice, not really a sense in the traditional sense). Said otherwise, the actions of the operator represent the operator's behavior during the activity session in the platform, such as his handling of the platform's control systems as well as his physiological state, such as his LOS during a combat situation. The actions of the operator can be part of an independent set of actions performed by the operator or in response to conditions of the environment and surroundings during the activity session. The actions of the operator can even be in response to voice commands given to the operator. Optionally, in one alternative, the disclosed technique can include recording the input of the operator of the vehicle, during an activity session. In another alternative, the disclosed technique includes recording at least one parameter of the platform during the activity session. This can also include recording the state or status (i.e., a plurality of parameters) of the platform. In a further embodiment, the disclosed technique can include recording parameters relating to both the platform as well as the operator. The disclosed technique further involves generating a virtual clone (i.e., also referred to herein simply as clone) of the vehicle or platform according to at least one of the recorded parameters during the activity, either of the platform, actions of the operator or both. The disclosed technique also includes managing the virtual clone according to a predetermined profile or doctrine. Put another way, the virtual clone simulates the platform or vehicle as well as the actions of a virtual operator as operated according to the predetermined profile or doctrine (i.e., by the book). This may optionally include simulating either the actions of a virtual operator or the outcome of an operator action (i.e., the simulation does not necessarily simulate a pilot turning a steering wheel but might simulate the movement of an aircraft in a given direction). It is noted that the clone can be computer generated based completely on the predetermined profile or can be based on the parameters of a human operator having completed the activity above a certain threshold of success. In general, the clone is generated according to parameters of the activity session. At minimum, the clone is generated according to at least one parameter of the activity session, and in the case that not all the parameters of the activity session are used to generate the clone, then the rest of the necessary parameters for generating the clone are generated externally without reference to what the operate did during the activity session. Once generated, the clone executes maneuvers of the platform and/or actions of the operator based on the predetermined profile. The predetermined profile may be executed according to what the operator did during the activity session above a predefined threshold of success. In one embodiment of the disclosed technique, the recorded state of the vehicle is monitored relative to the corresponding state of the virtual clone. In this manner, the state of the virtual clone, managed according to the doctrine, serves as a basis for evaluating the actions of the operator. The recorded state of the vehicle is presented to the operator along with the state of the virtual clone. In this manner, the operator, and other users, can review the activity session of the operator with respect to the doctrine (i.e., as represented by the virtual clone that is managed according to the doctrine). The evaluating of the actions of the operator can be presented to the operator visually (i.e., video presentation), aurally (i.e., an audio presentation), via a grade or mark and the like. In another embodiment of the disclosed technique, a comparison parameter of the activity session is compared with the same comparison parameter of the clone. The comparison parameter may be one of the recorded parameters during the activity session or it may be a derived parameter from one of the recorded parameters during the activity session. The comparison parameter can also be defined as whether an objective for an activity session was met with success, such as whether the target was successfully attacked, a missile was avoided, a missile was downed and the like. In this embodiment, a deviation may be determined between the activity session of the operator and the activity session of the clone. The deviation may be pinpointed to a specific time during the activity session (e.g., at time X, the operator turned left whereas according to the profile, the clone turned right) or may be representative of a period of time during the activity session (e.g., during the activity, the average altitude of flight of the operator was above 300 feet whereas according to the predetermined profile, the average altitude of flight of the clone was below 300 feet).

Over time, the recorded state of the vehicle may deviate from that of the clone. For example, in case the operator is not following the doctrine or profile to the letter, or in case the doctrine allows for several actions (e.g., the doctrine suggests taking a hard turn, but is indifferent to the direction of the turn). When the recorded state of the vehicle is different from that of the clone, the clone can no longer serve as a basis for reviewing the operator actions with respect to the doctrine. Therefore, the clone should be initialized, or a new clone should be generated. In general it is noted that there is a 1:1 correspondence between operator and clone, meaning for each operator and platform, a single virtual clone is generated. In general the clone represents the platform being operated by the operator (i.e., the clone doesn't necessarily represent a simulation of the operator but rather a simulation of the actions of the platform which are executed by the operator). For multiple operators, multiple clones may be generated. The virtual clone thus represents the operator operating the platform during the activity session according to all that is predetermined and set in the profile as well as according to the start conditions and parameters recorded of the operator when the actual activity was started. This can be with regards to maneuvering of the platform and to actions of the operator, such as inputs to a control system of the platform, vocal commands or utterances and even the desired LOS of the operator in the platform during the activity session.

A deviation input is defined as input of the operator that deviates from the doctrine. The input of the operator recorded during the activity session is compared with the actions or the outcomes of the clone managed according to the doctrine. An input deviating from the doctrine is marked, and is presented to the operator (and/or to other users). As mentioned above, in other embodiments, merely a deviation, and not a deviation input, is defined wherein the deviation may be between a derived parameter that is not specifically linked to a particular action of the operator during the activity session but rather an outcome or results of actions of the operator. It is noted as well that any deviations may be optionally presented to the operator after the activity session.

A deviation time point is defined as a time point at which the state of the vehicle deviates from that of the clone. For example, deviation time point can be defined as a time point at which the difference between the state of the vehicle and that of the clone exceeds a state-deviation threshold. Deviation time points are marked and are presented to the operator. As mentioned above, deviations between the operator and the clone may also be defined with respect to a time period or time block and not necessarily to a specific point in time. In line with the example given above, a deviation may be the average speed of the platform during the activity session as compared with the average speed of the platform in the virtual clone, where the two average speeds are greater than a parameter-deviation threshold.

A point of no return, or a critical time point, is defined as a time point within the activity session beyond which an objective of the activity session could not have been achieved. In other words, given the situation at the critical time point, and the state of the vehicle at the critical time point, the objective could not have been achieved by following the doctrine. Virtual clones generated (or initialized) according to the state of the vehicle recorded prior to a critical time point would achieve the objective, while clones generated (or initialized) according to the state of the vehicle recorded after a critical time point would fail in achieving the objective. Thereby, critical time points are determined and are presented to the operator.

A critical input is defined as an input of the operator which deviates from the doctrine, and which made it impossible to achieve the objective by following the doctrine. The last deviation input, or the last set of deviation inputs, preceding a critical time point, can be defined as a critical input. Alternatively, a human instructor identifies the critical input. Critical inputs are marked and are presented to the operator.

The state of the vehicle is defined by measureable state parameters, such as the position and orientation of the vehicle, the speed of the vehicle, the available armament, the fuel remaining, and the like. In case the vehicle is embodied by a simulator training device (also referred to herein simply as a simulator), the simulated state parameters are employed for defining the vehicle state. For example, in case of a flight simulator, the simulated position of the simulated aircraft and the simulated dynamics (e.g., speed and acceleration) of the simulated aircraft can be employed for defining the state of the aircraft. The input of the operator can include stick movements, steering wheel turns, operation of switches, pedals and levers, and the like. As mentioned above, the actions of an operator include the inputs of the operator as well as vocal commands or utterances and measurements of the LOS of the operator. It is noted that the term "recording" as referred to herein, relates to the process of capturing data, or translating information, to a recording format stored on some storage medium. The recorded data can be used in real time simultaneously with the recording operation, or can be used in retrospect.

Parameters, or state parameters, as recorded in the disclosed technique can be used to generate derived parameters. For example, a state parameter might be the speed of the platform or the altitude of the platform, whereas a derived parameter might be the average speed or average altitude of the platform. Derived parameters are not recorded per se but may be derived from recorded parameters.

Another aspect of the disclosed technique relates to an expanded doctrine or profile, wherein the predetermined profile or doctrine can include the vocal utterances or commands, the LOS of the operator at particular moments during the activity session, or both. The profile thus defines vocal utterances that are supposed to be uttered by an operator when certain actions happen during an activity session as well as where an operator should be looking during an activity session depending on particular circumstances of the activity session. Thus, the profile comparator of the disclosed technique can compare between vocal commands and the LOS of an operator during an actual activity session with the vocal commands and LOS of a virtual clone during the same activity session operating according to a predetermined profile.

The disclosed technique is described herein generally as an offline, post activity profile comparator, for use with a debriefing system. Therefore, most of the examples of the disclosed technique given below in describing the figures of the application relate to generating a clone and comparing the clone to the operator after the operator has completed an activity session. Deviations of the operator from the profile can thus be reviewed and discussed with the operator after the activity session. However, the disclosed technique is not limited to an offline, post activity profile comparator, but can also be embodied as an online, real-time guidance system, wherein time specific deviations of the operator as compared to the clone generated according to the profile can be pointed out in real-time to the operator. Examples of such are given below. Furthermore, the disclosed technique can also be embodied as a hybrid online-offline system, wherein certain parameters of the activity sessions are compared between the operator and clone online during the activity session whereas other parameters of the activity session are compared between the operator and the clone offline after the activity session is over and finished.

A further aspect of the disclosed technique relates to the comparison made between the actions of the operator and the maneuvering of the platform and the actions and parameters of the clone operated according to the predetermined doctrine or profile. According to this aspect, the parameters compared between the operator and the clone can be compared not just to the predetermined profile which the operator was initially supposed to operate the platform according to but to at least one other predetermined profile. For example, the predetermined profile might require an operator to operate a helicopter flying at an altitude of no more than 1000 feet, with the comparison being between the parameters of the activity session which are recorded and those of a clone operating according to the profile. According to the disclosed technique, the comparison could then further be made between the recorded parameters of the activity session and a different profile, such as fly at an altitude of no more than 2000 feet, to see if the operator might have remained closer, or with less deviations, from a different profile other than the one he might have attempted to follow during the activity session.

Reference is now made to FIG. 1, which is a schematic illustration of a graph, generally referenced 100, depicting the states of an aircraft and of a virtual clone of the aircraft, constructed in accordance with an embodiment of the disclosed technique. FIG. 1 depicts the recorded state of an aircraft 102, the simulated state of a virtual clone of the aircraft 104 (also referred to herein as clone 104), the simulated state of a $1^{st}$ missile simulation 106 targeting aircraft 102, and the simulated state of a $2^{nd}$ missile simulation 108 targeting clone 104.

In the example set forth in FIG. 1, aircraft 102 is a real aircraft operated by the operator (i.e., a pilot). The state of aircraft is recorded during an activity session (e.g., a training session). As mentioned above, at least one parameter of the aircraft is recorded, wherein a plurality of parameters together form the state of the aircraft. $1^{st}$ missile simulation 106 is a virtual simulation of a missile targeting aircraft 102. $1^{st}$ missile simulation 106 is generated (and its state or at least one parameter is recorded) during the activity session, such that the pilot of aircraft 102 tries to evade $1^{st}$ missile simulation 106 during the activity session.

Clone 104 is a virtual clone of aircraft 102 generated according to the recorded state or at minimum to the recorded at least one parameter of aircraft 102, recorded at a time point $t_0$, during an activity session and operating according to the doctrine or profile. It is noted that clone 104 can be generated during debriefing following the activity session. $2^{nd}$ missile simulation 108 is generated with clone 104, such that $1^{st}$ missile simulation 106 tracks aircraft 102, and $2^{nd}$ missile simulation 108 tracks clone 104. At a time point $t_1$, the recorded state of aircraft 102 deviates from the state of clone 104, and therefore, the recorded state of $1^{st}$ missile simulation 106 deviates from that of $2^{nd}$ missile simulation 108. As mentioned above, the deviation from aircraft 102 and clone 104 might also be the result of a difference which accumulated over time, such as a different average altitude. In this respect, the deviation at a time point $t_1$ might represent when the average altitude of the aircraft or the clone is different by more than a predefined threshold.

In accordance with an alternative embodiment of the disclosed technique, $2^{nd}$ missile simulation 108 is generated only when the state of clone 104 deviates from that of aircraft 102 (i.e., at time point $t_1$), such that a respective missile simulation tracks each of the aircraft and the clone. Thus, the evasive maneuvers of the aircraft and the clone are separately reviewed, and can be compared.

It is noted that both $1^{st}$ missile simulation 106 and $2^{nd}$ missile simulation 108 simulate the same missile launched at the aircraft. $2^{nd}$ missile simulation 108 is generated for allowing the debriefing system of the disclosed technique to monitor the consequences of the deviation of the operator from the doctrine. Specifically, in the example of FIG. 1, $2^{nd}$ missile simulation 108 targets clone 104 for determining whether clone 104 evaded the simulated missile by following the doctrine or profile.

For instance, in case $2^{nd}$ missile simulation 108 is generated when clone 104 is generated, the state of $2^{nd}$ missile simulation 108 at time point $t_0$ is identical to that of $1^{st}$ missile simulation 106 at that time point (as can be seen in FIG. 1). In case $2^{nd}$ missile simulation 108 is only generated at the deviation time point $t_1$, the state of $2^{nd}$ missile simulation 108 at time point $t_1$ is identical to that of $1^{st}$ missile simulation 106 at that time point. For example, in case at time point $t_1$, the state of the simulated missile was such that only 30% of its fuel remained, $2^{nd}$ missile simulation would also have only 30% fuel. Thereafter, the state of $2^{nd}$ missile simulation 108 deviates from that of $1^{st}$ missile simulation 106, as each targets a target having a different state (i.e., the state of clone 104 is different than that of aircraft 102).

The magnitude of the deviation (between the aircraft state and the clone state) can also be determined and recorded. For example, the doctrine suggests firing four flares at two seconds intervals. In a first scenario, the operator fired three flares, and in a second scenario the operator only fires a single flare. In both scenarios the operator deviated from the doctrine, though the deviation magnitude in the first scenario (three flares) is smaller than in the second scenario (a single flare). Naturally, the deviation magnitude may affect the outcome (e.g., the operator in the first scenario may evade a missile, while the operator in the second scenario may be hit).

In accordance with another embodiment of the disclosed technique, aircraft 102 can also be simulated by a flight simulator training device. In accordance with yet other embodiments of the disclosed technique, aircraft 102 can be replaced with other vehicles, stations or systems, whose state can be recorded. As mentioned above, the comparison between the aircraft, platform, FSTD and the like and the clone is not limited to a comparison of states. The comparison might be merely a comparison of a single recorded parameter of the aircraft and the same parameter for the generated clone being operated according to the profile. Furthermore, the comparison might not be between an actual parameter recorded of the aircraft, as the compared parameter or parameters might be derived parameters, such as average speed derived from the recorded speed of the aircraft.

The state of each of aircraft 102, clone 104, $1^{st}$ missile simulation 106 and $2^{nd}$ missile simulation 108 is depicted in FIG. 1 as a line. Specifically, a line representing the state of aircraft 102 (also referred to herein as the state line of the aircraft) is depicted as a dot/dash line. A state line of clone 104 is depicted as a double-dot/dash line. A state line of $1^{st}$ missile simulation 106 and a state line of $2^{nd}$ missile simulation 108 are both depicted as dotted lines. Each point in each of the state lines of aircraft 102, clone 104, and missile simulations 106 and 108, represents the state of the respective entity at a selected time point. Thus, a state line represents the variations in the state of the respective entity over time.

The state lines of aircraft 102, clone 104, $1^{st}$ missile simulation 106 and $2^{nd}$ missile simulation 108 are depicted in a coordinate system. In the example set forth in FIG. 1, the axes of the coordinate system represent altitude (the vertical axis in FIG. 1), longitude (the horizontal axis) and latitude (the axis that is normal to the image plane). The state of an entity is quantifiable. The state of each entity is given by the values of each of the state parameters. The parameters measured for quantifying the state can be varied, and can include position parameters, orientation parameters, dynamics parameters (e.g., speed and acceleration), and vehicle health parameters. Vehicle health parameters are parameters detailing damages and malfunctions of the systems of a vehicle, for example, an inoperative engine (i.e., as determined for example, by an Integrated Vehicle Health Management system). Generally, any quantifiable parameter indicating the state of a vehicle can be employed for representing the state of the vehicle. Other parameters that can be employed for defining the state of the vehicle, or more generally the situation of the vehicle, include remaining armament, remaining fuel, the amount of targets destroyed, the amount of remaining targets, and any other quantifiable or measureable parameter for defining the situation and the state of the vehicle. As mentioned above, the parameters used for defining the state of the vehicle or platform can also be derived parameters which are not directly measured but are derived from measured parameters, such as average speed, average altitude and the like.

As can be seen in FIG. 1, at time point $t_0$, $1^{st}$ missile simulation 106 is "launched" toward aircraft 102. Additionally at time point $t_0$, clone 104 is generated and $2^{nd}$ missile simulation 108 is "launched" toward clone 104. As mentioned above, both $1^{st}$ missile simulation and $2^{nd}$ missile simulation simulate the same missile launched against the aircraft (targeting the aircraft and the clone of the aircraft, respectively). The state of $1^{st}$ missile simulation 106 is identical to the state of $1^{st}$ missile simulation 106, at the time at which $2^{nd}$ missile simulation is generated (i.e., $2^{nd}$ missile simulation 108 branches out from $1^{st}$ missile simulation 106). Clone 104 allows reviewing the performance of the operator of aircraft 102 with respect to the doctrine. $2^{nd}$ missile simulation 108 allows comparing the outcome of the operator performance to that of clone 104 operated according to the doctrine.

As also mentioned above, the state of clone 104 is identical to the state of aircraft 102 at the generation time ($t_0$). When running virtual clone 104 (i.e., which can be generated during debriefing after completion of the activity session), the state of aircraft 102 recorded at time point $t_1$ deviates from the state of clone 104. That is, the difference between the state of clone 104 and the state of aircraft 102 exceeds a deviation threshold. Therefore, time point $t_1$ is defined as a deviation time point. Accordingly, and as can be seen in FIG. 1, between time point $t_0$ and time point $t_1$, the state of $1^{st}$ missile 106 resembles that of $2^{nd}$ missile simulation 108, though not necessarily identical thereto (i.e., both are tracking targets behaving similarly). At time point $t_1$, the state of $2^{nd}$ missile simulation 108 deviates from that of $1^{st}$ missile simulation 106 (i.e., as the targets of each missile simulation behave differently).

As can be seen in FIG. 1, the operator of aircraft 102 maneuvered aircraft 102 differently than clone 104. Additionally, the operator may have acted differently (than the clone) in other or additional manners, such as operating countermeasures against the missile. The different actions of the operator with respect to clone 104 resulted in different outcomes. In particular, aircraft 102 was hit by $1^{st}$ missile simulation 106 whereas clone 104 successfully evaded $2^{nd}$ missile simulation 108. It is noted that herein below a missile hit, can also relate to the state in which the missile gets close to its target (e.g., close enough for its proximity fuse to detonate).

As mentioned above, time point $t_1$, at which the state of aircraft 102 deviates from the state of clone 104 is defined as a deviation time point. The deviation time point is determined by monitoring the state of the aircraft with respect to that of the clone. A difference between the state of the aircraft and that of the clone is quantified (e.g., as a numerical value, as a grade, as a binary value, and the like). The time point at which the quantified difference exceeds a state-deviation threshold is marked as a deviation time point.

The input of the operator deviating from the doctrine, and thus preceding the deviation time point, is defined as the deviation input. The recorded input of the operator is compared with the doctrine and the deviation input is determined. The deviation input can relate to an action of the operator, such as operating a switch, or to a lack of an action, such as a neglect to operate countermeasure (e.g., not firing a flare). In case the operator input is a continuous input, such as controlling stick movements or turning a stirring wheel (as opposed to the binary operation of a switch, for example), the input can be discretized. For example, every 20° turn of a steering wheel is considered as a discrete step. Thus, for example, in case the operator turned the wheel by 15° and the doctrine dictates a 10° turn, the operator input is considered as similar to the doctrine (and not as a deviation input). However, a 22° turn, would be considered as a deviating input as it is within the next turning step) (20°-40°). As described above, the deviation from the profile or doctrine might not be associated with a particular input of the operator but rather a general parameter or state of the operator which accumulated over time. Furthermore, according to the disclosed technique, other actions of the operator, besides inputs of the operator into the control systems of the aircraft, can be monitored and shown to be deviations from the doctrine. These actions might include vocal commands or utterances the operator is supposed to mention after certain actions or inputs, as well as the line-of-sight (LOS) of the operator. For example, the profile might dictate that an operator is to make visual contact with an incoming missile once detected. If the LOS of the operator is beyond a quantized threshold of the general direction from which the missile is coming then the change in LOS of the operator can be determined as the deviating action or input at a specific point in time.

The system and method of the disclosed technique, allow presenting to the operator the recorded state of the aircraft, the state of the clone (serving as a basis for review with respect to the doctrine), the deviation input deviating from the doctrine, and the deviation time point at which the state of the aircraft deviates from that of the clone. Thereby, for example, by presenting the recorded state of aircraft 102 and the state of clone 104, the disclosed technique allows reviewing the activity session of the operator with respect to the doctrine, and identifying deviations from the doctrine. Additionally, the disclosed technique allows reviewing the consequences of deviations from the doctrine (e.g., aircraft 102 is hit, while clone 104 evades the missile). Thus, the system and method of the disclosed technique can be employed during debriefing following the activity session, to assess the activity session, and to learn valuable lessons. As mentioned above, the presentation of the activity session as performed by the operator and as performed by a clone following the predetermined profile can be done visually (i.e., via a video presentation to the pilot of the aircraft and the clone in a graph similar to what is shown in FIG. 1), aurally (i.e., via an audio presentation), via a grade or mark (i.e., how successful was the pilot in following the profile or doctrine as a number between 1-100).

In accordance with another embodiment of the disclosed technique, one or more objectives can be defined for the activity session. The objectives can be for example, evading a missile, evading being shot down, bombing or otherwise destroying a target, and the like. The objective should be defined such that it is quantifiable or measureable. That is, the objectives should be defined such that an objective failure can be determined from data available to the system of the disclosed technique, such as data obtained by various sensory systems (e.g., the radar of the aircraft, the Inertial Navigation System (INS) of the aircraft, the weapon systems of the aircraft, ground-based radar stations, and radar systems of other vehicles). In accordance with an alternative embodiment, the objective failure (or success) can be determined by an external system. For example, the objective failure is determined by a ground based radar system, an Airborne Warning and Control System, or the missile simulation system determining that the simulation missile has hit its target. Further alternatively, a human controller or instructor can determine whether or not an objective was achieved.

In the example set forth in FIG. 1, the objective is evading the missile. Thus, the objective is quantified by a binary value of either evading the missile or being hit. An objective evaluator module determines whether aircraft 102 have been hit by the missile. Generally, the objective evaluator determines whether the objective was achieved or failed, and in case of failure the objective evaluator determines the time point at which the objective was failed (e.g., the aircraft was hit by the missile).

A critical time point is defined as a time point beyond which the objective could not have been achieved by following the doctrine. In other words, from the state of the aircraft recorded at the critical time point, the objective would not be achieved (i.e., would fail). The critical time point is also referred to herein as a point of no return. A critical input is defined as an input of the operator that resulted in the failure of the objective. For example, the operator did not fire flares when trying to evade the missile and five seconds later was hit by the missile. Thus, the objective is determined to be a failure (i.e., the aircraft was hit by the missile). The time point at which the aircraft was hit is the time point of the objective failure. The time point preceding the hit by five seconds is determined as the critical time point, and the failure to fire the flare is determined as the critical input.

The critical time point is determined by determining which virtual clones achieve the objective and which virtual clones fail. Specifically, a clone generated prior to the critical time point would achieve the objective, and a clone generated after the critical time point would fail. By reviewing the operator input preceding the critical time point, the critical input is identified. The critical input is a deviation input preceding the critical time point. In the example detailed herein above, the critical input is the neglect to fire the flares. It is noted that in this example, the critical input is actually a lack of input. Thus, the critical input can relate to an actual input or to a lack of required input. Alternatively, the critical input can be determined by a human instructor, reviewing the recording of the operator input and the recording of the vehicle state, during debriefing.

Figure 2:
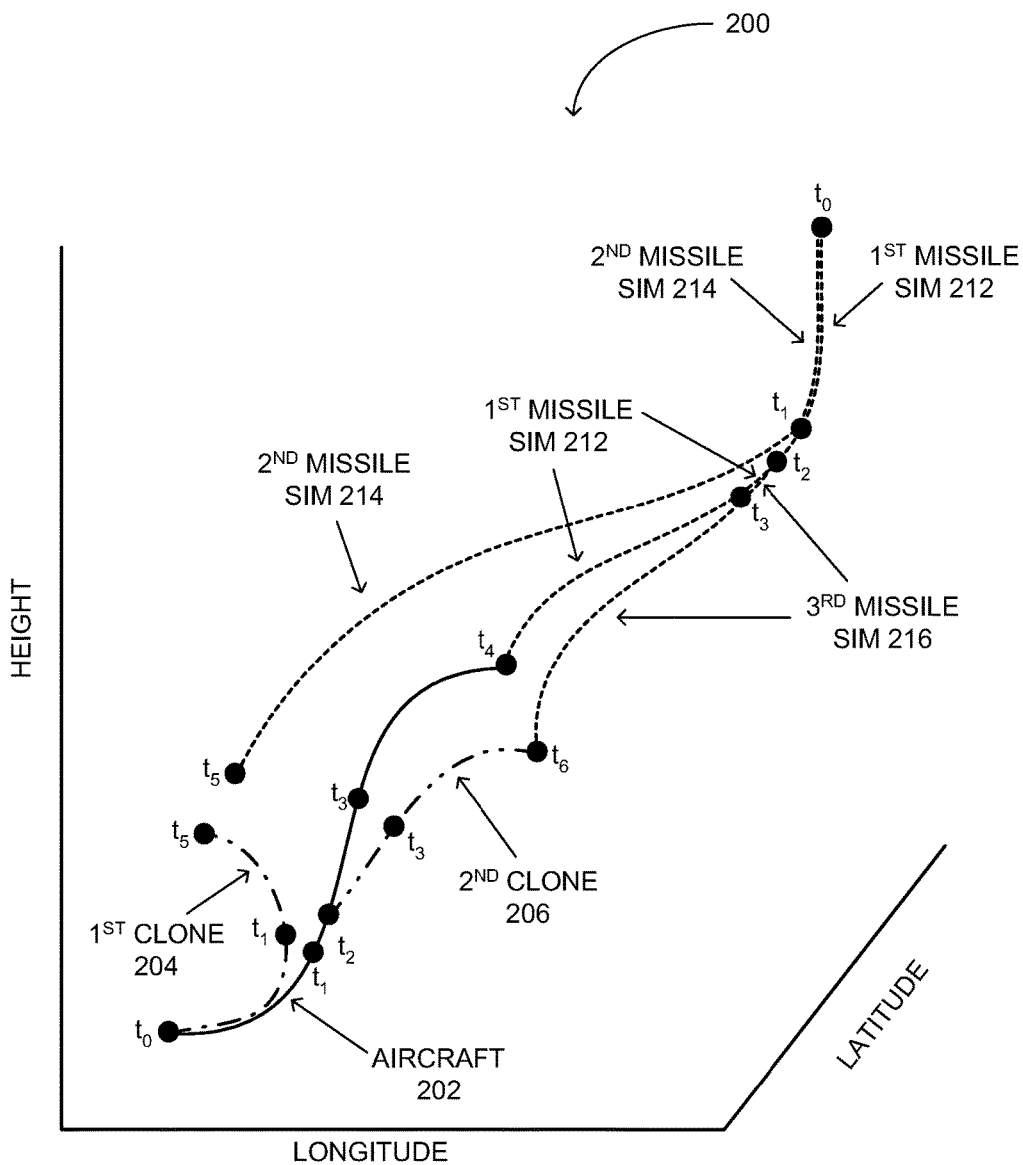
FIG. 2 is a schematic illustration of a graph depicting the states of an aircraft and virtual clones of the aircraft, constructed in accordance with another embodiment of the disclosed technique.

Reference is now made to FIG. 2, which is a schematic illustration of a graph, generally referenced 200, depicting the states of an aircraft and virtual clones of the aircraft, constructed in accordance with another embodiment of the disclosed technique. FIG. 2 depicts the state lines an aircraft 202 (solid line), a $1^{st}$ clone 204 (a dot/dashed line), a $2^{nd}$ clone 206 (double-dot/dashed line), a $1^{st}$ missile simulation 212, a $2^{nd}$ missile simulation 214, and a third missile simulation 216 (all missile simulations are depicted as dotted lines).

In the example set forth in FIG. 2, aircraft 202 is simulated by a flight simulator training device, and the state of aircraft 202 is recorded during a training session. $1^{st}$ missile simulation 212 is a virtual simulation of a missile targeting aircraft 202. $1^{st}$ missile simulation 212 is generated (and its state is recorded) during the training session, such that the pilot of aircraft 202 tries to evade $1^{st}$ missile simulation 212 during the training session.

During debriefing, following completion of the training session, $1^{st}$ virtual clone 204 of aircraft 202 is generated according to the state of aircraft 202 recorded at a time point $t_0$ during the training session. $2^{nd}$ virtual clone 206 of aircraft 202 is generated according to the state of aircraft 202 recorded at a time point $t_2$ during the training session. In accordance with an alternative embodiment of the disclosed technique, the clones can be generated during the training session (and not only during debriefing) for evaluating operator performance in real-time).

Clones 204 and 206 can run simultaneously. That is, $1^{st}$ Clone 204 is not terminated when $2^{nd}$ clone 206 is generated. Clones 204 and 206 are managed according to a predetermined doctrine, and according to their state (i.e., and more generally according to their situation). Put another way, a virtual clone is managed as if its simulated pilot follows the instructions of the doctrine. Thus, clones 204 and 206 can serve as a basis for reviewing the training session (or any other activity session) of the operator of aircraft 202 with respect to the doctrine. It is noted that more virtual clones of the aircraft can be generated. The clones can be generated periodically, at predetermined time points, or can be generated at time points determined according to the data obtained during the activity session. For example, a new clone can be generated every ten seconds, or a new clone can be generated at the occurrence of predefined events, such as at the time point of a launching of a missile targeting the aircraft or when the state of the previous clone is deemed to be different from the state of the aircraft.

During an activity session (e.g., the training session), the state of aircraft 202 is recorded. In the example set forth in FIG. 2, aircraft 202 is simulated by a simulator training device, which simulates and records the state of aircraft 202. Alternatively, in case of a real aircraft, the state parameters defining the state of aircraft 202 can be gathered via onboard systems (e.g., the INS of the aircraft), and via remote systems (e.g., a ground-based radar station and the radar of another aircraft). Further alternatively, in case the operator is operating a different vehicle, station or system, the state of that system is recorded by respective systems. For example, the state of a tank can be recorded by the tank onboard systems, such as GPS sensor, cannon orientation sensor, and the like.

Additionally, the input of the operator is also recorded. The input data is gathered via input interfaces coupled with the input devices of the aircraft (or of the simulator device, in the example of FIG. 2), or via input recording components. As mentioned above, the recording operation is the operation of obtaining the data, translating it into a desired format and storing it on a storage medium. The recorded data (i.e., aircraft state and operator input) can be employed in real-time simultaneously with (or immediately following) the recording, or in retrospect after completion of the activity session. Specifically, the state of aircraft 202, and the input of the operator are recorded during the activity session by respective recording components. Additionally, the state of $1^{st}$ missile simulation 212 targeting aircraft 202 is also recorded.

During debriefing following the activity session, $1^{st}$ clone 204 and $2^{nd}$ clone 206 are generated, as well as $2^{nd}$ missile simulation 214 and third missile simulation 216 targeting each of the clones, respectively. Specifically, $1^{st}$ clone 204 is generated according to the state of aircraft recorded at a time point $t_0$, and $2^{nd}$ clone 206 is generated according to the state of aircraft recorded at a time point $t_2$. The recorded state of aircraft 202 is monitored with respect to the state of each of clones 204 and 206. $2^{nd}$ missile simulation 214 tracking $1^{st}$ clone 204 is generated with $1^{st}$ clone 204, at time point $t_0$. $3^{rd}$ missile simulation 216 tracking $2^{nd}$ clone 206 is generated with $2^{nd}$ clone 206, at time point $t_2$. It is noted that $3^{rd}$ missile simulation 216 branches out from $1^{st}$ missile simulation 212 at the generation time point of $3^{rd}$ simulation 216 ($t_2$). That is, at time point $t_2$, the state of $3^{rd}$ missile simulation 216 is identical to that of $1^{st}$ missile simulation 212. The missile simulations targeting the aircraft and each of the clones allow comparing the outcome of the operator performance with the outcome of the performance of the clones.

At deviation time point $t_1$ the recorded state of aircraft 202 deviates from the state of $1^{st}$ clone 204. Therefore, at time point $t_1$, the state of $2^{nd}$ missile simulation 214, targeting $1^{st}$ clone 204, deviates from that of $1^{st}$ missile simulation 212 targeting aircraft 202. In a similar manner, at deviation time point $t_3$ the recorded state of aircraft 202 deviates from the state of $2^{nd}$ clone 206. Therefore, at time point $t_2$, the state of $3^{rd}$ missile simulation 216, targeting $2^{nd}$ clone 206, deviates from that of $1^{st}$ missile simulation 212 targeting aircraft 202.

It is noted that once a clone state deviates from the recorded state of the aircraft, it can no longer serve as basis for evaluating the actions of the operator. That is, given a different state (of the aircraft and the clone), the actions of the clone and the actions of the operator may differ, even when both are following the doctrine. Therefore, in accordance with an embodiment of the disclosed technique, virtual clones of the vehicle are repeatedly generated (or at least initialized) for maintaining the state of at least one clone to be similar to that of the vehicle.

Deviation time points $t_1$ and $t_3$ are determined by monitoring the state of aircraft 202 with respect to the state of clones 204 and 206. Specifically, when the difference between the recorded state of aircraft and that of a clone (e.g., $1^{st}$ clone 204 or $2^{nd}$ clone 206) exceeds a state-deviation threshold, a deviation time point is marked. As mentioned above the state of an entity is quantifiable and is given by a set of state parameters. In the example set forth in FIG. 2, the state is given by the altitude, longitude and latitude coordinates. Thus, the difference between the state of aircraft and that of a clone can be defined as the distance between aircraft 202 and the clone, at a given time.

Generally, for any set of state parameters, the state of an entity at a given time point is defined by the vector of the values of the state parameters within a respective multi-dimensional space. For example, in case there are five state parameters, a vector of five values of the state parameters (i.e., a location within a five-dimensional space) defines the state of the entity. The difference between the states of two entities (e.g., the vehicle and a virtual clone) can be defined by the distance between the respective locations within the five-dimensional space. Various distance metrics can be employed, such as Euclidean distance, Manhattan distance, Chebyshev distance (i.e., chessboard distance), and the like.

The actions of the operator can be monitored with respect to the doctrine by comparing the recorded input of the operator (recorded during the activity session) to the actions of the virtual clones. Thereby, deviation input can be marked and presented to the operator (and/or to other users). For example, in case the doctrine dictates firing a flare for evading a missile, and the operator did not fire the flare, the negligence to fire the flare would be marked as a deviation input. Naturally, a deviation input precedes a deviation time point, as it causes the state of the aircraft to differ from that of the clone (i.e., assuming the input affects the state of the aircraft as defined by the state parameters).

It is noted that some input is continuous (and not discrete). For example, turn angles of the aircraft (caused by stick movements of the operator) are continuous input, while switch operation is discrete. For determining when continuous input is deviating from the doctrine, the continuous input can be artificially discretized. For example, every 30° sector is considered as a single step. Thus, in case the clone made a 45° turn, and the operator made a 50° turn, the operator input would not be defined as a deviation input, even though it somewhat differs from the doctrine. However, in case the clone made a 25° turn, and the operator made a 35° turn, it would be considered as a deviation input (as the clone is in the first sector of 0-30°, and the aircraft is in the second sector of 30-60°). Alternatively, the discretization can relate to an allowed range of difference around the clone action. For example, in case the clone made a 25° turn, every turn of the operator between 10-40° (i.e., a range of 15°) would not be considered as deviating from the doctrine.

The input of the operator can further include the voice commands, and other oral communication input of the operator. The operator is recorded, and her oral communication is reviewed with respect to the doctrine. For example, in case the doctrine dictates that the operator would report an enemy aircraft when it is being detected by the radar of the aircraft 202, and the operator failed to report the enemy aircraft, the lack of such report would be marked as a deviation input. The input of the operator can also include her LOS at given moments during the activity sessions, wherein the profile or doctrine may dictate a specific LOS in the context of the activity session, such as to make visual contact with an enemy aircraft when it becomes visible or is detected by the radar of the aircraft. Failure to make visual contact within a predefined time period once an enemy aircraft is detected would then be marked as a deviation input.

The system and method of the disclosed technique allow presenting to the operator the recorded state of the aircraft, the states of the virtual clones, the deviation inputs and the deviation time points. In this manner, the operator can view her deviations from the doctrine and their consequences (as represented by the state of the clones).

As can be seen in FIG. 2, aircraft 202 is hit by $1^{st}$ missile simulation 212 at time point $t_4$; $2^{nd}$ clone 206 is hit by third missile simulation 216 at time point $t_6$; and $1^{st}$ clone 204 successfully evades $2^{nd}$ missile simulation 214 at time point $t_5$. A debriefing system and method in accordance with the disclosed technique can determine whether predefined objectives were achieved or failed, and can identify and present critical input which resulted in such failures. For instance, $1^{st}$ clone 204 successfully evades the missile. However, $2^{nd}$ clone 206 generated at time point $t_2$ could not evade the missile. Thus, time point $t_2$ can be defined as a point of no-return (or a critical time point), beyond which it is impossible to evade the missile. More accurately, as the critical time point is determined by looking at which clones evaded the missile and which were hit, the critical time point is a time point between $t_0$ and $t_2$. This is because $1^{st}$ clone 204 generated at $t_0$ evaded the missile, while $2^{nd}$ clone 206 generated at $t_2$ was hit. However, in accordance with an embodiment of the disclosed technique and in the example set forth in FIG. 2, the formal definition of the critical time point is at the generation point of the first clone to be hit—$t_2$. Alternatively, the critical time point can be defined as the generation time point of the last clone to successfully evade the missile—$t_0$. Further alternatively, other time point between $t_0$ and $t_2$ can be defined as the critical time point, such as the deviation point of the last clone to evade the missile—$t_1$; or the middle point between $t_0$ and $t_2$ (i.e., the generation time points of the last clone to evade the missile and the first clone to be hit, respectively). The deviation input shortly preceding critical time point $t_1$ can be defined as the critical input.

Different virtual clones can be managed according to different predetermined doctrines, for evaluating different aspects of the operator input, or for testing different doctrines and profiles. For example, in case of a training session for training a formation leader, the state of the aircraft would indicate the state (or more generally the situation) of the formation, and not only of the aircraft; and some clones would be managed according to a formation leader doctrine. Additionally, the formation leader can also be reviewed for evaluating her performance as an aircraft operator, and some clones would only relate to aircraft operator aspects of her performance. Thus, the operator which is also a formation leader would be evaluated on both operator aspects, and leader aspects, by employing respective clones.

In accordance with other embodiments, the state of various aircrafts can be recorded, and clones can be generated for each of the aircrafts. Thus, the disclosed technique can debrief the teamwork aspects of the operators of the aircrafts, and not only the individual performance. For example, a plurality of profile comparators may be employed for a plurality of platforms and operators. The disclosed technique can thus be used to simultaneously compare the activity sessions of a plurality of operators and platform. In addition, the disclosed technique can be used to compare teamwork of a plurality of operators of platforms in an activity session.

In the example set forth herein above with reference to FIGS. 1 and 2, the operator was a pilot of an aircraft. However, it is noted that operator can be controlling any other vehicle, station or system, and not only an aircraft. For example, the operator can control land vehicles, sea vehicles, space vehicles, or any other vehicle or station. For any operated system, the state of the system is recorded during an activity, and accordingly the actions (i.e., input) of the operator can be compared to a virtual clone managed according to a predetermined doctrine. Furthermore, as mentioned above, the disclosed technique is not limiting to moving, non-stationary platforms such as the vehicles listed above, but can also apply to stationary platforms and systems, like a guard post, a surveillance tower, a robotic surgery system, a crane and the like.

Figure 3:
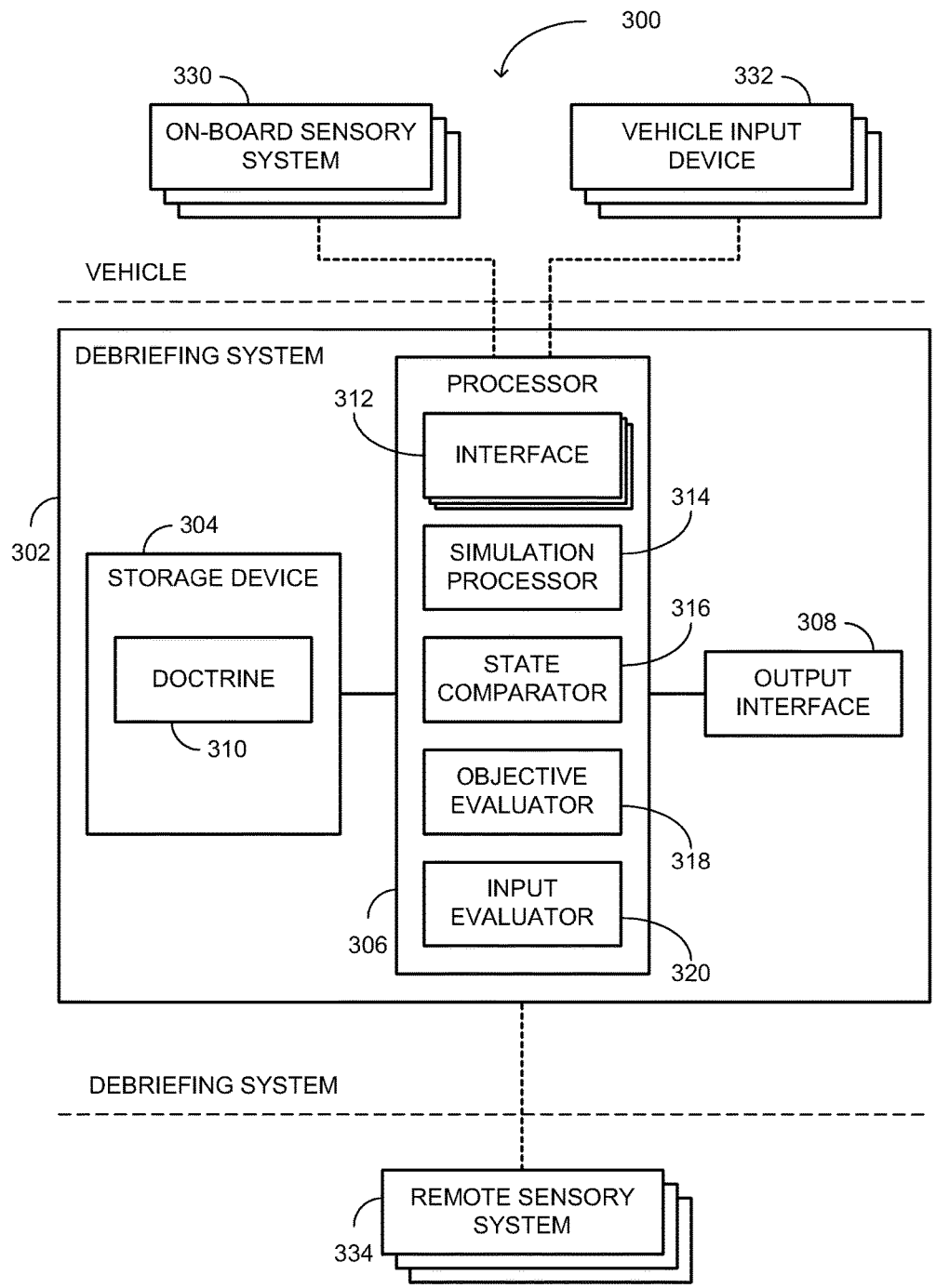
FIG. 3 is a schematic illustration of a system for identifying a deviation of an operator from a predetermined doctrine and the results of such deviation, constructed and operative in accordance with a further embodiment of the disclosed technique.

Reference is now made to FIG. 3, which is a schematic illustration of a system, generally referenced 300, for identifying a deviation of an operator from a predetermined doctrine or profile and the results of such deviation, constructed and operative in accordance with a further embodiment of the disclosed technique. System 300 includes a debriefing system 302, onboard sensory systems 330, vehicle input devices 332, and remote sensory systems 334. Debriefing system 302 is coupled with each of onboard sensory systems 330, vehicle input devices 332, and remote sensory systems 334.

It is noted that debriefing system 302 can be employed for debriefing an activity session of an operator of a vehicle, a station or any system. In the example, set forth in FIG. 3, debriefing system is employed for debriefing an activity session of an operator of a vehicle. It is further noted, that the vehicle can be simulated by a simulator training device. In such a case, the onboard sensory systems, and the remote sensory systems are not necessary, and the simulator produces all sensory data and environmental data. Additionally, the input devices of the simulator training device are employed as the vehicle input devices. For example, the switches of the simulator training device simulate the switches of a respective vehicle, and the switch operations of the operator are recorded by the simulator training device. In the case of both an actual vehicle and a simulator training device, onboard sensory systems might include systems for recording or registering voice commands or utterances of the operator as well as systems, such as eye-trackers and head-trackers, for measuring the LOS of the operator.

Generally speaking, debriefing system 302 and its components are constituted by a computer system including components such as a central processing unit that may be implemented with a conventional microprocessor (i.e., processor 306), a random access memory (RAM) for temporary storage of information, and a read only memory (ROM) for permanent storage of information. A memory controller is provided for controlling RAM. A bus interconnects the components of the computer system. A bus controller is provided for controlling the bus. An interrupt controller is used for receiving and processing various interrupt signals from the system components. Mass storage may be provided, for example, by a Hard Disc Drive (HDD) or by a flash drive. The computer system further includes a network interface that allows the system to be interconnected to a network, such as a local area network (LAN) or a wide area network (WAN). For example, when debriefing system 302 is installed on an aircraft, the network interface can interface to the datalink communication network of the aircraft, connecting between training participants. Operation of the computer is generally controlled and coordinated by operating system software that can be stored on the memory.

It is noted that debriefing system 302 can be a centralized system residing at a single location, or a decentralized system having various components residing in different locations and coupled via a network. Additionally, each component can be constituted by single component or an array of components, for example, processor 306 can be an array of processing devices located at the same site or at different sites.

Debriefing system 302 includes a storage device 304, a processor 306 and an output device 308. Processor 306 is coupled with each of storage device 304 and output device 308, and controls the operation thereof. Processor 306 includes a plurality of interfaces 312, a simulation processor 314, a state comparator 316, an objective evaluator 318 and an input evaluator 320.

The structure and function of each of the elements of system 300 would now be described, followed by a description of the interaction of these elements and the overall operation of system 300. Onboard sensory systems 330 are the sensory systems of the vehicle or platform (i.e., the vehicle can be an aircraft, seacraft, landcraft, or even an immobile station or any other system operated by an operator, such as a robotic surgical system). Sensory systems 330 are systems configured for gathering data by various sensing devices, such as radar, sonar, imaging devices, position and orientation sensors (e.g., inertial or based on external sources such as satellites transmissions, for instance Global Positioning System). Other examples of sensory systems include barometer, thermometer, accelerometer, odometer, and the like. Sensory systems 330 can further include systems directed at sensing (or measuring, or otherwise determining) various parameters of the vehicle, or of components of the vehicle, such as systems for monitoring the engine function, the fuel level, the armament status, and the like. Generally speaking, any onboard system which can obtain data respective of the state of the vehicle, the state of other vehicles or entities, and/or of the surrounding environment, can be defined as an onboard sensory system. The system of the disclosed technique employs data obtained by the onboard sensory systems for determining the state of the vehicle during an activity session and for determining the state of other entities (e.g., other vehicles, stations and units). The system of the disclosed technique can further employ the data for determining the input of the operator.

Remote sensory systems 334 are sensory systems located off the vehicle, for instance, on other vehicles or stations. For example, remote systems can include ground-based radar stations, the radar systems of an aircraft that is not the vehicle operated by the operator, and the like. Generally speaking, any remote system which can obtain data respective of the state of the vehicle, of other vehicles or entities, and/or of the surrounding environment, can be defined as a remote sensory system. The system of the disclosed technique employs data obtained by remote sensory systems 334 for determining the state of the vehicle during an activity session and for determining the state of other entities (e.g., other vehicles, stations and units). The system of the disclosed technique can further employ the data for determining the input of the operator.

Vehicle input devices 332 are the devices and systems of the vehicle that are configured for receiving operator input, such as pushbuttons, switches, joysticks, steering wheels, levers, pedals, touchscreens, microphones, and the like. Input devices 332 can further include components for recording the operator input, such as components for recording the joystick movements, the switches activations, and the like. Such recording components are either native to the aircraft, or are specially installed for the operation of debriefing system 300. As mentioned above, input devices 332 can also include components for measuring the LOS of the operator.

Continuous input devices, such as a steering wheel or a joystick, can be discretized by defining steps for range movements. For example, a turn of 15° of a steering wheel can be defined as a single step, such that the turn of the steering wheel falls into one of the following steps: 1-15°; 16-30°; 31-45°; 46-60°; and so on.

Storage device 304 includes a predetermined doctrine 310 stored therein. Predetermined doctrine 310 can be referred to as a predetermined profile as described above. Storage device 304 may further include additional data, such as data respective of the vehicle and other vehicles, data respective of the operator of the vehicle, data respective of the environment in which that activity session takes place, and the like. Additionally, processor 306 stores data gathered by other systems and modules (e.g., the sensory systems and the input devices), and data generated by processor 306, on storage device 304.

Output device 308 is a device, or a plurality of devices, configured to output data to the operator (or to additional or other users), such as a display, a speaker, a tactile output device, and the like. Output device 308 can be a device of system 300, or an output device of the vehicle (e.g., the Multifunction Display—MFDS—of an aircraft), employed by system 300.

Processor 306 is configured to control and direct the operation of all other components of system 300. Processor 306 receives data from, and provides data and instructions to, the other components. For example, processor 306 retrieves data from storage device 304, and stores data on storage device 304. Processor 306 includes modules that can be implemented either by hardware, firmware, software, or combination thereof. The modules of processor 306 depicted in FIG. 3 are merely exemplary modules, and the functions and operations of processor 306 described herein below may alternatively be performed by other, or additional, modules.

Interfaces 312 are configured for interfacing with the various systems, components and modules of system 300. For example, an interface for each of onboard sensory systems 330, interfaces for input devices 332, and interfaces for remote sensory systems 334. Each interface 312 can receive data from, and provide data and instructions to, the respective components or systems that it interfaces. Each interface 312 can translate data received from its respective interfaced system into a data format acceptable by processor 306, and vice versa. Interfaces 312 record the data gathered by the respective interfaced system (e.g., sensory system or input device) onto storage device 304.

Simulation processor 314 is configured to generate and run virtual clones (i.e., computer simulations) of the vehicle, and of other simulated entities. Simulation processor 314 receives data respective of the state of the vehicle as recorded at a selected time point (i.e., a generation time point), or at least one parameter of the vehicle, and generates a virtual clone of the vehicle accordingly. It is noted that the generation of the clone can occur after the actual time at which the state of the vehicle was recorded (e.g., during debriefing). In accordance with an alternative embodiment, the clone can be generated in real-time. In this alternative embodiment, online guidance can be given to the operator of the vehicle based on the actions and performance of the clone. Simulation processor 314 employs additional data for generating and managing the clones, such as data respective of predetermined doctrine 310, data respective of the simulated vehicle, data respective of other entities in the surrounding of the simulated entity (e.g., other vehicles, whether real or simulated), and the like.

State comparator 316 is configured to monitor the state of the vehicle relative the state of the clones (or at least of a selected clone). State comparator 316 compares the state of the vehicle to the state of the clone and quantifies the difference. The difference can be quantified as a numerical value, as a grade, as a binary state, and the like. For example, in the example set forth in FIGS. 1 and 2, the state difference is quantified as the distance between the position of the vehicle, and that of the clone. State comparator 316 defines a time point, at which the difference between the vehicle state and the simulation state exceeds a threshold, as a deviation time point. State comparator 316 may also be embodied as a parameter comparator, wherein a subset of the state of the vehicle is compared to a subset of the state of the clone. In this embodiment, parameters relating to the activity session of the vehicle are compared to the same parameters relating to the clone. These parameters may be recorded parameters by the onboard sensory systems and/or the vehicle input devices, however these parameters might also be derived parameters, which are derived from actual parameters that are recorded and stored from the platform. These parameters can also be recorded by an external recording system and in the case of the activity session taking place in a simulator (e.g., a FSTD), the simulator may record these parameters. The parameter comparator may only compare a single parameter between the vehicle and the clone and thus does not necessarily have to make a comparison between the state of the vehicle and the state of the clone. The parameter comparator can also compare between the outcome of the activity session of the operator and the outcome of the clone executing the predetermined profile.

The state of an entity (e.g., the vehicle or a clone) is defined by a plurality of state parameters or for that matter, measurable parameters relating to the platform, the operator and the actions of the operator in operating the platform during an activity session. The state parameters can be varied for different vehicle (e.g., the state parameters for an aircraft are different than those for a radar station or a submarine), and for different doctrines (e.g., for evaluating the performance of a formation leader different state parameters are employed than for evaluating the performance of a pilot led by the formation leader).

Objective evaluator 318 is configured for evaluating success or failure in a predefined objective of the activity session. For example, in case the objective is evading a missile and the vehicle was hit by the missile, objective evaluator 318 determines that the vehicle was hit (i.e., objective failure). Objective evaluator 318 further determines a critical time point beyond which the objective could not have been achieved. In particular, a clone generated (or initialized) prior to the critical time point would have achieved the objective, and a clone generated after the critical time point would fail. In accordance with various embodiments of the disclosed technique, the critical time point can be defined by various time points:

the generation time point of the last clone to achieve the objective ($t_0$ in FIG. 2 at which $1^{st}$ clone 204, which evaded the missile, was generated);

the deviation time point of the last clone to achieve the objective ($t_1$ in FIG. 2 at which the state of $1^{st}$ clone 204 deviates from the recorded state of aircraft 202);

the generation time point of the first clone to fail the objective ($t_2$ in FIG. 2 at which $2^{nd}$ clone 206, which was hit by the missile, was generated); or any other point between the generation time of the last clone to achieve the objective and the generation time of the first clone to fail (in FIG. 2, between $t_0$ and $t_2$).

Input evaluator 320 is configured to determine an input of the operator that deviates from doctrine 310. Input evaluator 320 receives the recording of the input of the operator, recorded during the activity session. Input evaluator 320 determines the deviation input by reviewing the recorded input with respect to the state of the clones. As the virtual clones are managed according to doctrine 310, a deviation in the state of the vehicle from that of the clone indicates a deviation from the doctrine. The doctrine dictates how to act in a given situation and the clones act according to the doctrine, and thus acting differently from a clone means acting differently from the doctrine. As mentioned above, a deviation from the doctrine or profile might not be specific to a given time but might be representative of actions take over a time period. Thus in this embodiment, input evaluator 320 might compare a comparison parameter between the vehicle and the clone, such as an average altitude and determine at what point in time and possible through which actions performed by the operator, did the average altitude of the vehicle exceed the average altitude dictated by the doctrine or profile by a predefined threshold. Input evaluator 320 compares the operator input to the clone actions, as inferred from the clone's state. Thereby, input evaluator 320 determines deviation input from the recording of the operator input. Usually, the deviation input shortly precedes the deviation time point, as the deviation from the doctrine causes the state of the vehicle to deviate from that of the clone. Input evaluator 320 thus determines which action or actions of the operator caused the deviation from the predetermined doctrine or profile.

Additionally, input evaluator 320 determines a critical input that is a deviation input preceding the deviation time point. The critical input can be composed of several actions, performed over a short period of time, and not only a single action. The critical input can also be a neglect to perform a required action. Alternatively, a human instructor can determine the critical time point, the critical input, or both.

Following is a general description of the operation and various embodiments of the system of the disclosed technique. The operator operates the vehicle during an activity session. The activity session can be, for instance, a training session or an operational activity. During the activity session, onboard sensory systems 330 and remote sensory systems 334 obtain and record data respective of the state of the vehicle, including a plurality of parameters related to the operation of the vehicle. Onboard sensory systems 330 and remote sensory systems 334 can further obtain and record data respective of the state of other entities, such as other vehicles, other stations and units, and environmental conditions (e.g., weather conditions). In case the vehicle is simulated by a simulator training device, the simulator produces all data respective of the vehicle, other entities and the environment. Input devices 332 receive and record the input of the operator during the activity session. The recordings are associated with a time stamp, so that the time of each recorded parameter, state and input can be determined.

In accordance with an embodiment of the disclosed technique, system 300 is employed for debriefing and operates after the activity session has ended. Debriefing system 302 receives the recordings of the state of the vehicle, and accordingly repeatedly generates virtual clones of the vehicle. Each clone is generated according to the state of the vehicle as recorded at a generation time point within the activity session recordings. The clones can be generated at a periodical manner, for example, every 30 seconds (or every other time period). The clones can be generated when a predetermined event occurs. Examples of such predetermined events include, the time point at which the difference between the state of the vehicle and the state of the previous clones exceeds a threshold, a missile targeting the vehicle is launched, the vehicle performs a predetermined maneuver, a parameter of the state of the vehicle is at a predetermined value, and the like.

Simulation processor 314 manages the clones of the vehicle according to predetermined doctrine 310 (and of course according to the situation of the clone, including data respective of other entities and of the environmental conditions). Different clones can be managed according to different predetermined doctrines for evaluating various aspects of the operator performance. For example, one doctrine is employed for evaluating an operator operating an aircraft, and another doctrine for evaluating an operator commanding a formation of aircrafts. In accordance with another embodiment of the disclosed technique, several debriefing systems, installed on several aircrafts, are employed for evaluating the teamwork aspects of a group of operators. Alternatively, a central debriefing system is employed for evaluating the teamwork aspects of a group of operators. In accordance with yet another embodiment, different clones can be generated according to different definitions of the state of the vehicle. For example, the state of the vehicle can relate to the position of the vehicle, or can relate to the armament status of the vehicle.

State comparator 316 monitors the vehicle state relative to clone state. State comparator 316 determines deviation time points, at which the vehicle state deviates from the clone state. For example, state comparator 316 compares the vehicle state to the simulation state, and quantifies the difference. Naturally, the states can be determined to be similar (i.e., the difference is defined as zero or non-existing). The difference can be quantified as a numerical value, a grade value, a binary value and the like. State comparator 316 determines the time point at which the difference exceeds a state-deviation threshold, and defines that time point as a deviation time point. For example, in case the difference is quantified as the distance between the position of the aircraft and that of the clone, the system determines the time at which that distance exceeds a predetermined threshold. As mentioned above, state comparator 316 may be a parameter comparator in which case at least one comparison parameter related to the either the vehicle, actions of the operator or both are compared to the comparison parameter of the clone.

Objective evaluator 318 determines whether a predefined objective of the activity session was achieved, and in case of failure, determines the critical time point. Input evaluator 320 determines a critical input preceding the critical time point.

On the other hand, in accordance with another embodiment of the disclosed technique, system 300 can determine that the actions of the operator (i.e., as determined by the recorded input) proved superior to the predetermined doctrine, and therefore that the doctrine should be updated, or at least reviewed. For example, in case the operator deviated from the doctrine, but the state of the vehicle following that deviation is deemed to be better than the state of the clone. The state of the vehicle can be determined to be superior according to measureable parameters, or according to the opinion of an expert. For example, in a dogfight, in case the maneuvering of the operator placed her in a position behind her foe, and the clone is situated such that it is pursued by its foe, the state of the vehicle is deemed to be superior. Parameters which may indicate a superior state may relate to the dynamics of the vehicle (position, orientation, speed and acceleration), armament status, fuel status, vehicle health status, and every other parameter used to define the state of the vehicle.

Input evaluator 320 determines deviation input deviating from the doctrine by comparing the recording of the input operator to the actions dictated by the doctrine in a given situation, as inferred from the state of the clones. That is, the state of the clone, managed according to the doctrine, indicates what should be done according to the doctrine in a given state. As long as the state of the clone resembles that of the vehicle, the state of the clone can serve as a basis for identifying deviations from the doctrine.

System 300 (i.e., simulation processor 314) repeatedly generates additional clones of the vehicle at subsequent time points because the state of previous clones might become different from the state of the vehicle over time. Each clone is managed according to the doctrine and according to its current state (or situation) including its state with respect to other entities (e.g., a missile targeting the clone). Thus, a clone whose state is substantially different from that of the vehicle may operate in a different manner than the operator even when both are following the doctrine. Previous clones are maintained for determining what might have been. For example, system 300 can determine that if the operator would have followed the doctrine at a selected time point, she would have evaded the missile.

Output device 308 presents the recorded state of the vehicle, the state of the clones of the vehicle, the recorded operator input, deviation inputs, and the critical inputs, to the operator (and/or to other users). System 300 thereby presents to the operator the consequences of her input (i.e., her actions). Thus, system 300 allows the operator to learn what could have been done otherwise to improve her performance. Output device 308 can present the state of the vehicle and the simulations in various time scales, allowing the operator to view her input in selected time resolutions.

As mentioned above, system 300 may generate clones after an activity session, thus allowing debriefing and the comparison between the operator of the vehicle and the predetermined doctrine or profile in an offline setting. In another embodiment, system 300 can be used as an online, guidance assistance system, wherein clones are generated while the operator operates the vehicle and comparisons between parameters of the vehicle and the inputs and actions of the operator are compared in real-time with the clone or clones being managed according to the predetermined profile or doctrine. Deviations can then be determined in real-time and corrective actions or inputs can be presented to the pilot as outputs, either visually or aurally. In accordance with a further embodiment of the disclosed technique, system 300 can work as both an online and offline system. Some of the parameters which make up the state of the vehicle and the state of the clone can be monitored and compared online while the operator is operating the vehicle whereas other parameters making up the state of the vehicle and the state of the clone can be monitored and compared offline after the activity session during a debriefing session. In this embodiment, the parameters monitored online might be parameters which are deemed critical to the operation of the vehicle for the operator to complete the activity session successfully, in other words to achieve a specific objective or objectives set out for the activity session. Parameters monitored offline might be parameters not deemed critical for success in achieving the objective(s) of the activity session, or derived parameters which might only be calculable after the activity session is over.

Figure 4:
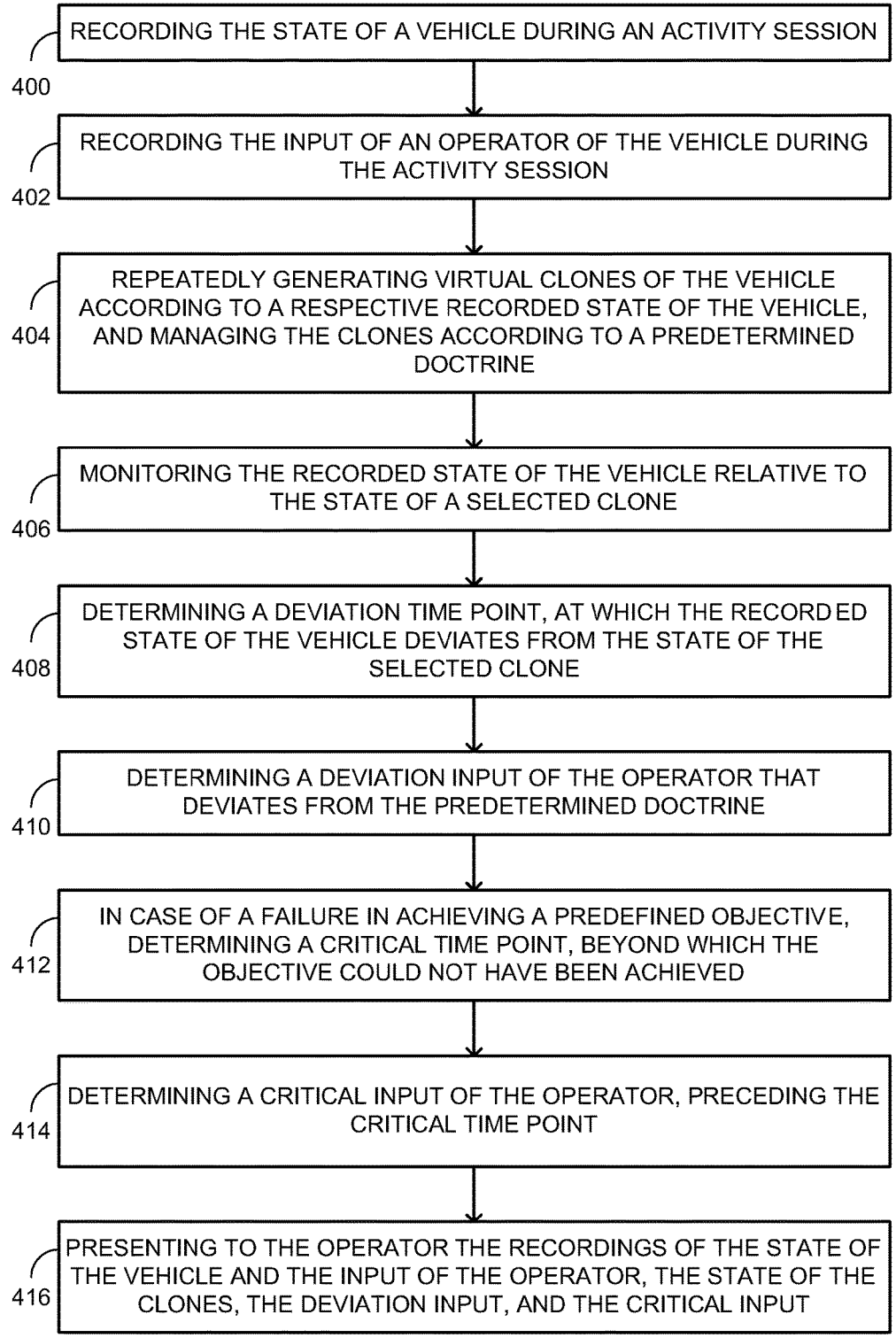
FIG. 4 is a schematic illustration of a method for identifying a deviation of an operator from a predetermined doctrine and the results of such deviation, operative in accordance with yet another embodiment of the disclosed technique.

Reference is now made to FIG. 4, which is a schematic illustration of a method for identifying a deviation of an operator from a predetermined doctrine and the results of such deviation, operative in accordance with yet another embodiment of the disclosed technique. In procedure 400, the state of a vehicle is recorded during an activity session. The state of the vehicle can be recorded by onboard sensory systems and by remote sensory systems. The state of the vehicle is defined by a set of measureable parameters. The set of measurable parameters can include position parameters, orientation parameters, dynamics parameters (e.g., speed and acceleration), vehicle health parameters, and any other quantifiable parameter indicating the state of the vehicle. With reference to FIGS. 1-3, onboard sensory systems 330 and remote sensory systems 334 record the state of the vehicle during the activity session. The state line of the vehicle depicted in FIGS. 1 and 2 represent the states of the vehicle recorded during the activity session. In the examples set forth in FIGS. 1 and 2, the state of the vehicle is defined as the position of the vehicle as determined by the altitude coordinate, the longitude coordinate and the latitude coordinate of the vehicle.

In procedure 402, the input of an operator of the vehicle is recorded during the activity session. The input of the operator is recorded via the input devices of the vehicle, such as pushbuttons, switches, levers, pedals, sticks, and touchscreens. In accordance with one embodiment of the disclosed technique, the input device is inherently capable of recording the input (i.e., the recording capability is inherent regardless of the disclosed technique). In accordance with another embodiment of the disclosed technique, dedicated recording components have to be coupled to at least some of the input devices for enabling recording the input. In accordance with an alternative embodiment of the disclosed technique, the input of the operator is not recorded, and instead can be determined according to the recorded state of the vehicle. For example, in case an aircraft is gaining altitude, it can be determined that the operator pulled the stick. With reference to FIG. 3, input devices 332 record the input of the operator during the activity session.

In procedure 404, virtual clones of the vehicle are repeatedly generated according to a respective recorded state of the vehicle (i.e., recorded at a respective generation time point within the activity session). The clones are managed according to a predetermined doctrine. The doctrine constitutes the conventional manner of acting in selected situations or in order to achieve a predefined goal. The clones can all be managed according to the same doctrine, or can be managed according to different doctrines. For example, different doctrines can relate to various aspects of the operator performance (a doctrine for an aircraft pilot, and another doctrine for a formation leader). It is noted that the doctrine or profile may be defined before procedure 400 as a first procedure in the described method.

In accordance with another embodiment of the disclosed technique, the states of several vehicles, and the input of each of the operators of these vehicles, are recorded. Virtual clones of each of these vehicles are generated and run according to doctrine relating to the teamwork of the operators. Thereby, a deviation of an operator from a teamwork-oriented doctrine, and its consequences, can be determined and presented to the operators.

Two or more clones can be managed according to the same doctrine and can be generated according to the state of the vehicle recorded at different time points during the activity session. Additionally, two or more clones that are managed according to different doctrines can be generated according to the state of the vehicle recorded at the same time point during the activity session.

With reference to FIGS. 2 and 3, simulation processor 306 (FIG. 3) generates $1^{st}$ clone 204 according to the state of aircraft 202 recorded at time point $t_0$ (FIG. 2), and generates $2^{nd}$ clone 206 (FIG. 2) according to the state of aircraft 202 recorded at time point $t_2$. Simulation processor 306 manages $1^{st}$ clone 204 and $2^{nd}$ clone 206 according to a doctrine 310 stored on storage device 304 (FIG. 3).

In procedure 406, the recorded state of the vehicle is monitored relative to the state of a selected clone. That is, the vehicle state (as recorded during the activity session) is compared to the clone state, over time. A difference between the vehicle state and the clone state is determined for each comparison time point, and is monitored over time. The difference between the vehicle state and the clone state at a selected time point can be defined (or quantified), for example, as a numerical value, a grade or a binary value. For instance, the difference can be quantified as the sum of differences between the values of each of the parameters constituting the state of the vehicle.

The difference can be quantified as the distance between a location representing the state of the vehicle in a coordinate space composed of the various parameters constituting the state of the vehicle, and the location of the clone state in that coordinate space. For example, the state of the vehicle is defined by the speed of the vehicle, longitude coordinate of the vehicle and latitude coordinate of the vehicle. A specific state of the vehicle is a location in a three-dimensional coordinate space having a speed axis, a longitude axis, and a latitude axis. The difference between the state of the vehicle and that of the clone is the distance (e.g., Euclidean distance) between the location of the vehicle state in the 3D coordinate space, and the location of clone state in that space.

With reference to FIGS. 2 and 3, state comparator 316 compares the recorded state of aircraft 202 with the state of clones 204 and 206. For instance, state comparator 316 defines the difference between the recorded state of aircraft 202 at time point $t_1$ and the state of $1^{st}$ clone 204 at that time point.

In procedure 408, a deviation time point, at which the recorded state of the vehicle deviates from the state of the selected clone, is determined. As mentioned above, with reference to procedure 406, the vehicle state is monitored relative to the clone state (i.e., the difference between the vehicle state and the clone state is quantified and monitored). The deviation time point is defined as the first time point at which the difference between the vehicle state and the clone state exceeded a threshold. With reference to FIGS. 2 and 3, state comparator 316 determines that $t_1$ is a deviation time point, as the difference between the state of aircraft 202 and that of clone 204 exceeds a threshold at that time point.

In procedure 410, a deviation input of the operator that deviates from the predetermined doctrine is determined. For example, in case a missile is fired at the aircraft of the operator and the operator maintained its course of flight, while the clone took a hard turn to the right. The lack of turning is defined as the deviation input. With reference to FIG. 3, Input evaluator 320 determines the deviation input of the operator.

In procedure 412, in case of a failure in achieving a predefined objective, a critical time point, beyond which the objective could not have been achieved, is determined. The activity session can include a plurality of objectives. Some examples of objectives are evading a missile or generally evading being shot down, destroying a target, reaching a target, preventing a foe from reaching a target, and the like. Any objective can be defined, as long as its failure can be determined according to data obtained from the onboard and remote sensory systems (e.g., according to the determined state of the vehicle). Alternatively, the objective failure and success can be determined according to the opinion of an expert (e.g., the instructor at a simulator training device).

First, it is determined that the operator has failed in achieving the objective (e.g., the vehicle was hit by a missile). Thereafter, a critical time point is determined. The critical time point is a time point at which the objective could no longer be achieved. The determination that the objective can no longer be achieved is made by reviewing the virtual clones, and specifically which clones achieved the objective, and which failed. A clone generated (or initialized) prior to the critical time point would achieve the objective, and a clone generated (or initialized) after the critical time point would fail in achieving the objective. Alternatively, the determination of the critical time point is made by a human instructor or expert.

With reference to FIGS. 2 and 3, objective evaluator 318 (FIG. 3) determines that at time point $t_4$ aircraft 202 was hit by the missile, and thereby determines that the objective has failed. Objective evaluator 318 further determines that time point $t_2$ is the critical time point. $1^{st}$ clone 204 successfully evades the missile. However, $2^{nd}$ clone 206, generated at time point $t_2$ is hit by the missile. Therefore, $t_2$ (i.e., or a time point shortly preceding it) is defined as the critical time point.

In procedure 414, a critical input of the operator is determined. The critical input is the input of the operator which resulted in the objective failure. Specifically, the critical input is the input beyond which, the objective could no longer be achieved. The critical input is defined as the deviation input (or collection of deviation inputs occurring together during a short time frame) preceding the critical time point.

For example, flares should be fired at a selected time point according to the doctrine, and the operator failed to fire the flares. Five seconds later, the vehicle was hit by the missile. The critical time point is five second earlier to the hit, when the flares should have been fired. The critical input is the neglect to fire the flares. Thus, the critical input can be a neglect to perform an action (instead of an erroneous action).

In accordance with an alternative embodiment of the disclosed technique, the critical input is determined by human instructor (or expert) reviewing the recording of the input of the operator. With reference to FIG. 3, input evaluator 320 determines the critical input, preceding the critical time point.

In procedure 416, the recordings of the state of the vehicle and the input of the operator, the state of the clones, the deviation input, and the critical input are presented to the operator. Thus, the operator can see her input and the consequence of such input, especially when deviating from the doctrine. The operator can learn valuable lessons from the activity session, and can improve her performance. With reference to FIGS. 2 and 3, the state of aircraft 202 deviated from the state of $1^{st}$ clone 204 at deviation time point $t_1$. Time point $t_2$ is defined as the critical time point, beyond which the missile hit could not have been avoided. Output device 308 presents the state of aircraft 202, the states of the $1^{st}$ clone 204 and $2^{nd}$ clone 206, the recording of the operator input, the deviation input (e.g., preceding time point $t_1$) and the critical input (preceding time point $t_2$).

As mentioned above, the state of the vehicle, and the operator input are recorded during the activity session. Over time, such recordings are aggregated in a recordings database and can be employed for statistical analysis. In accordance with another embodiment of the disclosed technique, a plurality of recordings of vehicle states and operator input are employed for determining common mistakes repeated by a plurality of different operators. Such common mistakes can be stressed during training sessions, and mission briefings to allow future operators to avoid such common mistakes.

In accordance with a further embodiment of the disclosed technique, the recordings database can be analyzed in order to try and improve the doctrine. The recorded states and inputs are analyzed for trying to understand which operator actions led to preferable vehicle states, and higher chances of achieving predefined objectives. The recording database can further be employed for improving the doctrine by serving as a prediction tool, predicting the common reactions of the operators to various situations. For example, it is determined that many operators tend to turn to the right, and not to the left when faced with such a choice. The doctrine can be updated to suggest a turn to the left for surprising the enemy. The recording database can further be employed for trying to predict the actions of the enemy, based on the intuitive reactions of operators to a given situation.

In the example set forth herein above, with reference to FIGS. 1 and 2, the vehicle was an aircraft (FIG. 1) or a flight simulator training device simulating an aircraft (FIG. 2). In accordance with other embodiments, the debriefing system of the disclosed technique can be employed for debriefing an activity session of an operator operating other systems (e.g., other vehicles or stations). The following paragraphs would detail exemplary activity sessions of operators of such other systems.

In accordance with an embodiment of the disclosed technique, the operated system is a formula race car. The state of the car is recorded during a race. The state can be defined by the speed, the position, the wheel condition, the wheel type, the fuel status, and other parameters of the race car. The input of the driver is also recorded during the race. For example, the steering wheel angle, the force applied onto the gas pedal, and the like. The doctrine or profile can relate to the approach angle to the turn, the timing of entering the pit during the race, and the like. During debriefing following the race, the system produces virtual clones of the car and manages the clones according to a racing doctrine. The debriefing system shows the driver her deviations from the doctrine, and the consequences thereof.

In accordance with another embodiment of the disclosed technique, the vehicle can be a tank, and the operator is a tank operator. For instance, the operator is a tank commander (i.e., a tank is usually operated by a crew and not a single operator). The state of the tank is recorded during a training session, or an operational activity session. The state of the tank is defined by a plurality of state parameters, such the tank location, the tank speed and acceleration, the tank armor health, the armament status, the fuel status, and the like. Additionally, the input of the tank commander is recorded during the activity session. For instance, the tank commander input can include, the voice commands to other crew members, turret traversing via a stick, weapons operating triggers (e.g., machine guns, tank cannon), countermeasures triggers (e.g., smoke grenades), and the like. Following the activity session, virtual clones of the tank are repeatedly generated, and are managed according to a predetermined tank commander doctrine or profile. The recorded state of the tank is monitored with respect to the state of the virtual tank clones, and deviation input time points, deviation input, critical time point, and critical input are determined. The recorded state of the tank, the recorded input, the deviation time points and input, and the critical time points and input, are presented to the operator for debriefing the activity session. For instance, when approaching enemy tanks, the doctrine requires the tank to mount up to a hill, such that only the upper portion of its turret and its cannon are visible, then fire some shots, retreat downhill, and mount up again to a different position. During training session, the tank commander mounted uphill but maintained position and did not change positions every few shots, and the tank was hit. The deviation input, would be the failure to retreat downhill and change positions.

In accordance with another embodiment of the disclosed technique, the operator is a surgeon operating a robotic surgery system. During surgical operation, the state of the robotic surgery system is recorded. For example, the state parameters can include the spatial position of the robotic tool, the physiological position of the robotic tool, the patient's clinical indicators (e.g., blood pressure, pulse, respiratory rate, ECG, and the like), and the like. The input of the surgeon is also recorded, for instance, the stick movements, switches operation, and the like. During debriefing, virtual clones of the robotic surgery system are generated and are managed according to conventional surgical procedures (i.e., surgical doctrine or profile). The recorded state of the robotic system is monitored with respect to the state of the clones.

In accordance with a further embodiment of the disclosed technique, the operator is operating an unmanned marine vehicle, such as an unmanned submarine, or an unmanned surface vehicle. The state of the unmanned marine vehicle is recorded during an activity session. For example, the state can be defined by parameters, such as location, speed, acceleration, health status, armament status, fuel status, and the like. As with other vehicles and systems, the operator input is also recorded. During debriefing, virtual clones are generated, the recorded state of the unmanned marine vehicle is monitored with respect to the state of the clones.

It will be appreciated by persons skilled in the art that the disclosed technique is not limited to what has been particularly shown and described hereinabove. Rather the scope of the disclosed technique is defined only by the claims, which follow.

The invention claimed is:

1. A vehicle platform profile comparator for comparing between at least one parameter of a vehicle platform during an activity session performed according to a human operator and at least one parameter of a virtual vehicle platform during said activity session performed according to at least one clone according to at least one respective predetermined profile, said at least one clone representing both a virtual operator and said virtual vehicle platform during said activity session and said at least one respective predetermined profile representing at least one of a set of actions and outcomes of said virtual vehicle platform during said activity session, comprising:

at least one control system for modifying said at least one parameter of said vehicle platform;

a storage device comprising said at least one respective predetermined profile and a recording of at least one parameter modified by said human operator using said at least one control system during said activity session;

a simulation processor, coupled with said storage device, configured to generate said at least one clone according to said recorded at least one parameter, said simulation processor being further configured to manage said at least one clone according to said at least one respective predetermined profile until an end of said activity session;

a parameter comparator, coupled with said simulation processor and said storage device, configured to compare at least one comparison parameter between said vehicle platform and said virtual vehicle platform and further configured to determine at least one deviation wherein said at least one comparison parameter of said vehicle platform recorded during said activity session of said human operator deviates from said at least one comparison parameter of said virtual vehicle platform performed by said at least one clone generated and managed by said simulation processor; and an output device, coupled with said simulation processor, for presenting at least one of said at least one deviation and a management of said at least one clone according to said at least one respective predetermined profile during said activity session, wherein during said activity session said at least one clone is generated at least one of:
each time said at least one deviation is determined; and
when a predetermined event occurs.

2. The vehicle platform profile comparator according to claim 1, wherein said at least one parameter of said vehicle platform comprises at least one action selected from a list consisting of:
a physical maneuvering of said vehicle platform by said human operator using said at least one control system;
an input of said human operator on said vehicle platform via at least one input device of said at least one control system;
at least one vocal utterance of said human operator during said activity session; and
at least one line-of-sight (LOS) measurement of said human operator during said activity session.

3. The vehicle platform profile comparator according to claim 1, wherein said simulation processor generates said at least one clone of said virtual vehicle platform at a time period selected from a list consisting of:
after said activity session;
online during said activity session; and
after said activity session and online during said activity session.

4. The vehicle platform profile comparator according to claim 1, wherein said at least one clone is generated according to said recording of said at least one parameter of said vehicle platform when said recording of said at least one parameter of said vehicle platform is performed by said human operator above a threshold of success during said activity session.

5. The vehicle platform profile comparator according to claim 1, wherein said vehicle platform is selected from a list consisting of:
a land vehicle;
a sea vehicle;
an aircraft;
a space vehicle; and
a vehicle simulator.

6. The vehicle platform profile comparator according to claim 1, further comprising:

at least one sensory system, coupled with said storage device, configured for recording said at least one parameter of said vehicle platform, wherein a state of said vehicle platform comprises a plurality of said at least one parameter of said vehicle platform; and at least one input interface, coupled with said at least one control system, configured for recording an action of said human operator via said at least one control system.

7. The vehicle platform profile comparator according to claim 1, further comprising:
an input evaluator, coupled with said storage device and said parameter comparator, configured to determine which said at least one parameter of said vehicle platform modified by said human operator caused said at least one deviation; and
an objective evaluator, coupled with said storage device and said parameter comparator, configured to determine that said human operator failed in achieving a predefined objective of said activity session.

8. The vehicle platform profile comparator according to claim 7, wherein said simulation processor is configured for generating a plurality of clones of said virtual vehicle platform, said parameter comparator being configured for comparing said at least one comparison parameter between said human operator and said plurality of clones and for determining a respective deviation time point at which said at least one comparison parameter of said human operator deviates beyond a predetermined threshold from said at least one comparison parameter of each one of said plurality of clones; and
wherein said objective evaluator is further configured to determine a critical time point beyond which said predefined objective could not have been achieved by determining which of said plurality of clones achieve said predefined objective and which of said plurality of clones fail in achieving said predefined objective, wherein said plurality of clones generated prior to said critical time point achieve said predefined objective and said plurality of clones generated after said critical time point fail in achieving said predefined objective.

9. The vehicle platform profile comparator according to claim 7, said input evaluator configured to determine a deviation input by determining which said at least one parameter of said vehicle platform modified by said human operator caused said at least one deviation, said deviation input being an action of said human operator deviating from said at least one respective predetermined profile, said input evaluator further configured to determine a critical input of said human operator from said at least one parameter of said vehicle platform modified by said human operator and recorded by said storage device, said critical input being said deviation input that made it impossible to achieve said predefined objective by following said at least one respective predetermined profile.

10. The vehicle platform profile comparator according to claim 1, wherein said predetermined event is selected from a list consisting of:
a first time point during said activity session wherein said at least one comparison parameter of a previously generated one of said at least one clone is different than said at least one comparison parameter during said activity session;
a second time point wherein said at least one comparison parameter of a previously generated one of said at least one clone exceeds a threshold difference as compared to said at least one comparison parameter during said activity session;
when said vehicle platform performs a predetermined maneuver;
a predetermined action of said human operator;
a predetermined voice utterance of said human operator;
when said recording of said at least one parameter of said vehicle platform is at a predetermined value;
when a first action is performed on said human operator; and
when a second action is performed on said vehicle platform.

11. The vehicle platform profile comparator according to claim 7, wherein said simulation processor is configured for generating a plurality of clones of said vehicle platform, said parameter comparator being configured for comparing said at least one comparison parameter between said human operator and a selected one of said plurality of clones and for determining a respective deviation time point at which said at least one comparison parameter of said human operator deviates from said at least one comparison parameter of said selected one of said plurality of clones; and
wherein said simulation processor is configured to manage at least a first one of said plurality of clones according to a first one of said at least one respective predetermined profile, and configured to manage at least a second one of said plurality of clones according to a second one of said at least one respective predetermined profile.

12. A method for comparing a vehicle platform profile between a human operator operating a vehicle platform during an activity session and at least one clone operating a virtual vehicle platform during said activity session according to at least one respective profile, said at least one clone representing both a virtual operator and said virtual vehicle platform during said activity session and said at least one respective profile representing at least one of a set of actions and outcomes of said virtual vehicle platform during said activity session, said method comprising:
defining said at least one respective profile for said activity session on said vehicle platform;
recording a state of said vehicle platform during said activity session, said state of said vehicle platform comprising a plurality of parameters recorded during said activity session of said vehicle platform;
recording at least one input of said human operator operating said vehicle platform during said activity session, said at least one input comprising at least one of a modification of a platform parameter of said vehicle platform and an action of said human operator;
generating at least one clone according to said state of said vehicle platform and managing said at least one clone according to said defined at least one respective profile;
monitoring said state of said vehicle platform relative to a state of a selected one of said at least one clone;
determining at least one deviation wherein said state of said vehicle platform deviates from said state of said selected one of said at least one clone; and
presenting to said human operator at least one of said at least one deviation and said managing of said at least one clone according to said at least one respective profile during said activity session,
wherein during said activity session said at least one clone is generated at least one of:
each time said at least one deviation is determined; and
when a predetermined event occurs.

13. The method according to claim 12, further comprising a procedure of determining a deviation input of said human operator by comparing said plurality of parameters recorded during said activity session of said vehicle platform with respect to said state of said selected one of said at least one clone, said deviation input being a recorded at least one input of said human operator operating said vehicle platform during said activity session deviating from said defined at least one respective profile.

14. The method according to claim 12, further comprising:
determining that said human operator failed in achieving a predefined objective of said activity session;
generating a plurality of clones, wherein said procedures of monitoring said state of said vehicle platform relative to said state of said selected one of said at least one clone and determining said at least one deviation, are performed for each one of said plurality of clones;
determining a critical time point beyond which an objective could not have been achieved by determining which of said plurality of clones achieve said objective and which of said plurality of clones fail in achieving said objective, wherein said plurality of clones generated prior to said critical time point achieve said objective and said plurality of clones generated after said critical time point fail in achieving said objective;
determining a deviation input of said human operator by comparing of said at least one input of said human operator with respect to at least one of said plurality of clones, said deviation input being at least one input of said human operator deviating from said at least one respective profile; and
determining a critical input of said human operator from said at least one input of said human operator, said critical input being said deviation input which made it impossible to achieve said objective by following said at least one respective profile.

15. The method according to claim 12, wherein said method is performed for a plurality of platforms operated by a plurality of human operators, and wherein said at least one respective profile relates to a teamwork of said plurality of human operators.

16. The method according to claim 12, further comprising:
generating a plurality of clones of said vehicle platform, wherein said procedures of monitoring said state of said vehicle platform relative said at least one clone and determining at least one deviation, are performed for each one of said plurality of clones; and
managing at least a first one of said plurality of clones according to a first one of said at least one respective profile, and managing at least a second one of said plurality of clones according to a second one of said at least one respective profile.

17. A debriefing system for comparing between a human operator
operating a vehicle platform during an activity session and at least one clone operating a virtual vehicle platform during said activity session according to at least one respective predetermined profile, said at least one clone representing both a virtual operator and said virtual vehicle platform during said activity session and said at least one respective predetermined profile representing at least one of a set of actions and outcomes of said virtual vehicle platform during said activity session, comprising:

at least one control system for modifying at least one parameter of said vehicle platform;

a storage device comprising said at least one respective predetermined profile and a recording of said at least one parameter modified by said human operator using said at least one control system during said activity session;

a simulation processor, coupled with said storage device, configured to generate said at least one clone according to said recording of said at least one parameter, said simulation processor being further configured to manage said at least one clone according to said at least one respective predetermined profile until an end of said activity session;

a parameter comparator, coupled with said simulation processor and said storage device, configured to compare at least one comparison parameter between said vehicle platform and said virtual vehicle platform and configured to determine at least one deviation wherein said at least one comparison parameter of said vehicle platform recorded during said activity session of said human operator deviates from said at least one comparison parameter of said virtual vehicle platform performed by said at least one clone generated and managed by said simulation processor; and an output device, coupled with said simulation processor, for presenting at least one of said at least one deviation and a management of said at least one clone according to said at least one respective predetermined profile during said activity session;

wherein during said activity session said at least one clone is generated at least one of:
 each time said at least one deviation is determined; and
 when a predetermined event occurs.

18. The method according to claim 12, wherein said predetermined event is selected from a list consisting of:
 a first time point during said activity session wherein at least one comparison parameter of a previously generated one of said at least one clone is different than at least one comparison parameter during said activity session;
 a second time point wherein said at least one comparison parameter of a previously generated one of said at least one clone exceeds a threshold difference as compared to said at least one comparison parameter during said activity session;
 when said vehicle platform performs a predetermined maneuver;
 a predetermined action of said human operator;
 a predetermined voice utterance of said human operator;
 when said state of said vehicle platform is at a predetermined value;
 when a first action is performed on said human operator; and
 when a second action is performed on said vehicle platform.

* * * * *